United States Patent

Ono et al.

[11] Patent Number: 6,113,022
[45] Date of Patent: *Sep. 5, 2000

[54] RETRACTOR FOR SEAT BELT

[75] Inventors: Katsuyasu Ono; Masuo Matsuki; Satoshi Hirase, all of Kanagawa, Japan

[73] Assignee: NSK Ltd., Tokyo, Japan

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/095,935

[22] Filed: Jun. 12, 1998

Related U.S. Application Data

[63] Continuation of application No. 08/801,498, Feb. 18, 1997, Pat. No. 5,794,877.

[30] Foreign Application Priority Data

| Feb. 16, 1996 | [JP] | Japan | 8-52644 |
| Apr. 23, 1996 | [JP] | Japan | 8-123950 |
| Nov. 25, 1996 | [JP] | Japan | 8-313507 |

[51] Int. Cl.$^7$ .................................................. B60R 22/28

[52] U.S. Cl. ........................................................ 242/379.1

[58] Field of Search ..................... 242/379.1, 383.2, 242/383.5; 280/805, 806; 297/470, 471, 472

[56] References Cited

U.S. PATENT DOCUMENTS

| 3,632,060 | 1/1972 | Balder . |
| 3,834,646 | 9/1974 | Heath . |
| 3,857,528 | 12/1974 | Fiala . |
| 4,322,046 | 3/1982 | Tanaka et al. . |
| 5,628,469 | 5/1997 | Fohl . |
| 5,636,806 | 6/1997 | Sayles . |
| 5,660,347 | 8/1997 | Baker ..................... 242/379.1 |

FOREIGN PATENT DOCUMENTS

| 2025417 | 9/1970 | France . |
| 2519868 | 7/1983 | France . |
| 85 15 327 U1 | 8/1985 | Germany . |
| 19517440A1 | 11/1995 | Germany . |
| 44 26 479 A1 | 2/1996 | Germany . |
| 44 36 810 A1 | 4/1996 | Germany . |
| 195 41 837 A1 | 5/1996 | Germany . |
| 4730029 | 11/1972 | Japan . |
| 5220525 | 2/1977 | Japan . |
| 54-100023 | 8/1979 | Japan . |
| 2-45 088 | 11/1990 | Japan . |
| 8127313 | 5/1996 | Japan . |
| 2002627A | 2/1979 | United Kingdom . |
| 04996 | 12/1997 | WIPO . |

*Primary Examiner*—John M. Jillions
*Attorney, Agent, or Firm*—Sughrue, Mion, Zinn, Macpeak & Seas, PLLC

[57] ABSTRACT

It is an object to provide a retractor for a seat belt having a locking means and a shaft which can be twisted and exhibiting satisfactory safety. A retractor 1 for a seat belt according to the present invention having a locking means 100, which is capable of inhibiting rotation of a bobbin 3 around which a webbing 50 is wound in a direction in which the webbing 50 is drawn out in an emergency of a vehicle, a torsion bar 200A is disposed between the bobbin 3 and the locking means 100 and arranged to be twisted to respond to the instance wherein a predetermined load is applied to the locking means 100 so as to rotate the bobbin 3 in the direction in which the webbing 50 is drawn out. The retractor 1 for a seat belt has a rotation restraining mechanism 300 for restraining rotation of the bobbin 3 when the bobbin 3 has been rotated by a predetermined angle in the direction in which the webbing 50 is drawn out to correspond to torsion of the torsion bar 200A.

2 Claims, 33 Drawing Sheets

FIG.38(a)
FIG.38(b)
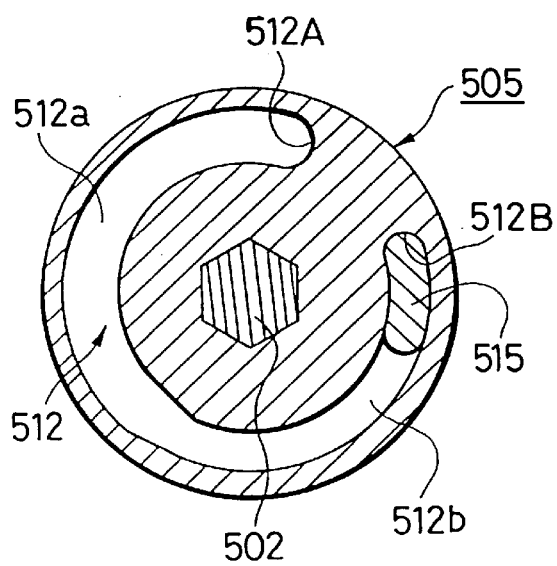
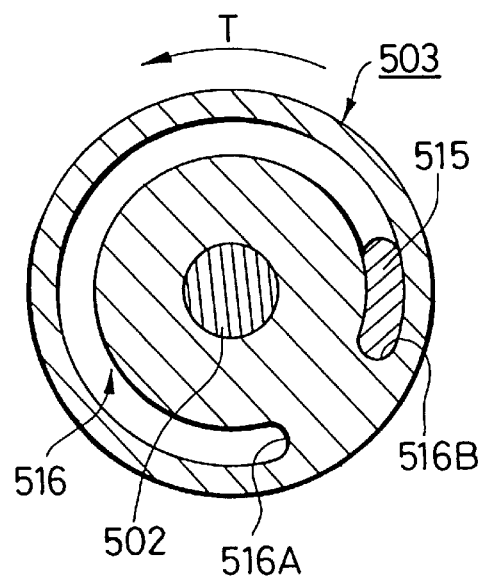
FIG.39
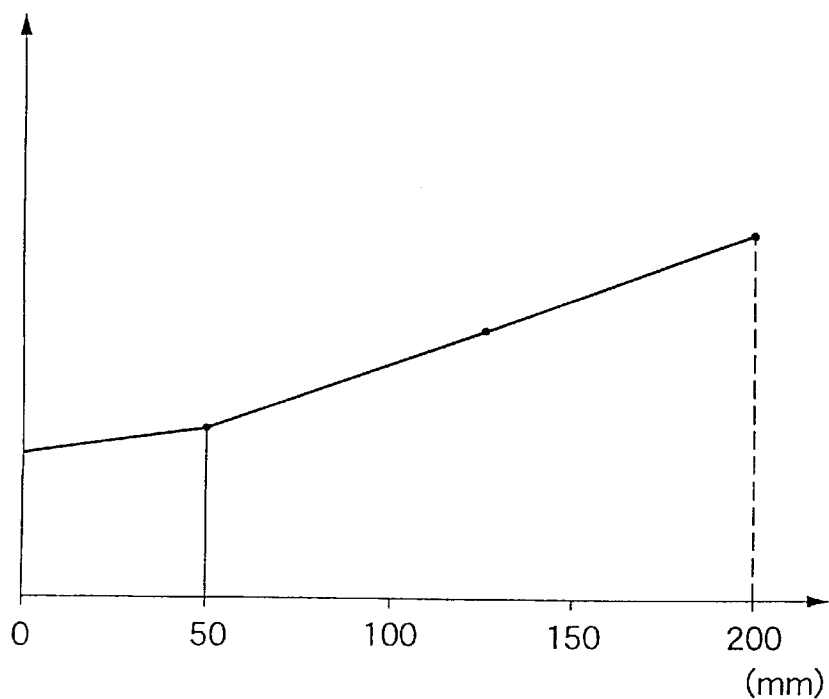

RETRACTOR FOR SEAT BELT

This is a continuation of Ser. No. 08/801,498 filed Feb. 18, 1997 now U.S. Pat. No. 5,794,877.

BACKGROUND OF THE INVENTION

The present invention relates to a retractor (a wind-up apparatus) for a seat belt apparatus, and more particularly to a retractor for a seat belt having an energy absorption mechanism.

Hitherto, a retractor for a seat belt for safely supporting a passenger or the like in a vehicle seat has been an emergency locking type retractor having an emergency locking mechanism provided with an inertia sensitive means for reacting to rapid acceleration, collision or deceleration so as to physically lock the retractor in order to effectively and safely restrain the passenger, and arranged to moderate the pressure of the webbing to the passenger.

As an emergency locking type retractor of the foregoing type, a retractor for a seat belt disclosed in, for example, Japanese Patent Laid-Open No. 50-79024, Japanese Patent Publication No. 59-21624 and Japanese Utility-Model Publication No. 2-45088, has a structure having a locking means provided with an engagement member disposed at an end of a wind-up shaft, around which the webbing is wound, and arranged to be engaged to a receiving-side engagement portion of the retractor base in a vehicle emergency so as to inhibit the rotation of the wind-up shaft in a direction in which the webbing is drawn out.

The locking means has the receiving-side engagement portion, which is an engaging connection portion, provided for a through hole in the wind-up shaft for a retractor base through which the wind-up shaft is inserted or ratchet teeth formed in an internally-toothed plate provided for the through hole in the wind-up shaft. Moreover, a lock plate and an engagement claw, which are rotated together with the wind-up shaft, are employed as the engagement members. In an emergency of the vehicle, the engagement members and receiving-side engagement members are engaged to one another so as to prevent rotation of the wind-up shaft in the direction in which the webbing is drawn out.

Since a structure in which the rotation of the wind-up shaft is simply inhibited by a locking means wherein the webbing unintentionally gives the human body a shock attributable to a state of the emergency of the vehicle, a structure must be provided with which the webbing is drawn out if a load is further applied to the locking means after the rotation of the wind-up shaft has been inhibited. As a retractor for a seat belt of a type having the above-mentioned structure, an "energy absorbing apparatus particularly for a safety belt" disclosed in Japanese Patent Laid-Open No. 46-7710 has been known.

The above-mentioned apparatus has a structure provided with a wind-up member to which the force is transmitted from the energy absorbing apparatus and a holder structured to be relatively rotative with respect to the wind-up member. Moreover, a torsion bar (an energy absorbing mechanism) is disposed between the holder and the wind-up member. The torsion bar is twisted around the axis thereof so that the rotation of the wind-up shaft is inhibited by the locking means. When a load is further applied to the locking means, the webbing is arranged to be drawn out. In the above-mentioned structure, the amount of the torsion of the torsion bar is not limited.

However, the state where the amount of the torsion of the torsion bar is not limited raises a risk that the passenger sometimes encounters a so-called secondary collision in a vehicle of a type having a small space therein attributable to an excessively large amount of drawing of the webbing. Therefore, a countermeasure has been required to improve the safety.

Since shock, which arises attributable to a collision, is different owning to the structure of the vehicle, a load curve of energy absorption loads (loads which act on the webbing) must be changed to be adaptable to the characteristic of the vehicle to obtain an arbitrary load characteristic in order to satisfactorily protect the body of the passenger.

However, the energy absorption mechanism using the above-mentioned torsion bar involves the torsional deformation torque for the torsion bar being substantially constant. Therefore, the energy absorption torque is substantially constant in the overall operating range for the torsion bar.

An object of the present invention is to provide a retractor for a seat belt having a locking means and a shaft which can be twisted and exhibiting satisfactory safety.

Another object of the present invention is to reduce the size of a retractor for a seat belt of a type having a locking means and a shaft which can be twisted and exhibiting satisfactory safety.

Another object of the present invention is to provide a retractor for a seat belt which is capable of overcoming the above-mentioned problems and having a satisfactory energy absorption mechanism adaptable to the characteristic of the vehicle and capable of efficiently absorbing collision energy acting on the body of a passenger when the vehicle has encountered a collision.

SUMMARY OF THE INVENTION

The above-mentioned objects of the present invention can be realized by a retractor for a seat belt comprising: a retractor base; a shaft rotatively attached to said retractor base; a bobbin which is secured to an end of said shaft and around which a webbing is wound; a locking member secured to the other end of said shaft; an emergency locking mechanism for inhibiting rotation of said locking member in a direction in which said webbing is drawn out in an emergency of a vehicle; and a rotation restriction mechanism disposed between said bobbin and said locking member to restrict the amount of torsion of said shaft to a predetermined amount when rotation of said locking member has been inhibited by said emergency locking mechanism.

With the retractor for a seat belt having the above-mentioned structure, the rotation of the locking member is temporarily inhibited by the emergency locking mechanism. If a load larger than a predetermined value is applied from the webbing to the bobbin, the bobbin is rotated to correspond to torsion of the shaft so as to permit the webbing to be drawn out. Since the state where the webbing can be drawn out is limited by the rotation restraining mechanism to a predetermined angle, the amount of the webbing which can be drawn out is restrained to an appropriate value even if the shaft is excessively twisted in an emergency of the vehicle. It is preferable that the rotation restraining mechanism of the retractor for a seat belt structured as described above is provided with guide portions formed in one of the bobbin and the locking member and elongated in a direction in which the shaft is rotated for a predetermined length, and a lock piece which is movable along the guide portion.

Since the retractor for a seat belt having the above-mentioned structure permits its lock piece to slide in the guide portion, the bobbin is able to rotate even after the rotation of the locking member has been temporarily inhibited by the emergency locking mechanism. Since the rotational angle of the bobbin is limited to correspond to the length of the guide portion, the amount of the webbing which can be drawn out is however limited to an appropriate length even if the shaft is excessively twisted in an emergency of the Vehicle. As a result, safety can be assured during driving the vehicle.

It is preferable that the retractor for a seat belt having the above-mentioned structure be formed such that the shape of the guide portion is in the form of a C-shape or a spiral shape.

Since the retractor for a seat belt having the above-mentioned structure is provided with the guide portion which is in the form of the C-shape or a spiral shape, the rotational angle can be restrained to correspond to the length of the guide portion. Therefore, even if the shaft is excessively twisted in an emergency of the vehicle, the amount of the webbing which can be drawn out is restrained to an appropriate amount. As a result, safety can be assured during the drive of the vehicle.

Moreover, the shape of the guide portion can be adapted to the type of the vehicle to arbitrarily select the limited rotational angle of the shaft. Thus, an advantage can be realized in that an appropriate limited rotational angle can be set to be adaptable to the type and performance of the vehicle.

It is preferable that the guide portion has a first guide portion provided for one of the bobbin and the locking member and a second guide portion provided to the other one, the lock piece has a first lock piece which is guided in a first guide portion and a second lock piece which is guided in a second guide portion, and a rotational plate is further provided which is disposed between the drum and the locking member and which has a first guide disposed opposite to the first guide portion at a position between the drum and the locking member and arranged to accommodate the first lock piece and a second guide disposed opposite to the second guide portion and arranged to accommodate the second lock piece.

The retractor for a seat belt having the foregoing structure is provided with at least one rotational plate. When the plural lock pieces slide in the guide portion provided for the rotational plate, the rotational angle of the shaft is restrained. Therefore, even if the shaft is twisted excessively in an emergency of the vehicle, the amount of the webbing which can be drawn out can be restrained to an appropriate amount.

Moreover, the shape of the guide portion can be made adaptable to the type of the vehicle and thus the restrained rotational angle of the shaft can arbitrarily be selected.

The guide portion has a first guide portion provided for one of the bobbin and the locking member and formed into a substantially circular arc shape and a second guide portion provided for the other member and arranged to have a curvature radius which is different from that of the first guide portion, the lock piece having first lock piece which is guided in the first guide portion and a second lock piece which is guided in the second guide portion, and a rotational plate is provided which has a first through hole formed between the bobbin and the locking member, having substantially the same shape as that of the first guide portion and arranged to accommodate the first lock piece and a second through hole having substantially the same shape as that of the second guide portion and arranged to accommodate the second lock piece.

The retractor for a seat belt having the above-mentioned structure permits the first lock piece to slide in the first C-shape groove and the first through hole. Moreover, the second lock piece is able to slide in the second C-shape groove and the second through hole. Therefore, the bobbin is able to rotate even after the rotation of the locking member has been temporarily inhibited by the emergency locking mechanism. Since the rotational angle of the shaft is restrained to correspond to the total length of the length of the first C-shape groove and that of the second C-shape groove, the amount of the webbing which can be drawn out is restrained to an appropriate amount even if the shaft is excessively twisted in vehicle emergency vehicle.

Since the plural rotational plates are combined with one another, the restrained rotational angle of the shaft can arbitrarily be determined.

As a result, safety in driving the vehicle can be improved. Since the first through hole and the second through hole are formed in the direction of the thickness of the rotational plate, the length of the retractor in the axial direction rotation restraining mechanism can be shortened and the size of the retractor can be reduced as compared with the structure using the rotational plate claimed in claim 1. Since the combination of the plural rotational plates enables the restrained rotational angle of the shaft to be determined arbitrarily, an advantage can be obtained in that an appropriate limited rotational angle can be determined to be adaptable to the type and performance of the vehicle.

The above-mentioned objects of the present invention can be achieved by a structure such that the guide portion has a guide groove, and the guide groove has a wide portion having a groove width larger than the width of the lock piece and a narrow portion having a groove width smaller than the width of the lock piece.

It is preferable that the guide portion is in the form of a C-shape guide groove formed in either opposite surface of the locking member or the bobbin and the lock piece, which is integrally formed, project over the other opposite surface.

It is preferable that the lock piece is borne by the shaft to be rotatively provided for the guide portion.

BRIEF DESCRIPTION OF THE DRAWINGS

FIGS. 35(a) and 35(b) are explanatory views for showing the operations of an energy absorption mechanism for the bobbin and the locking plate according to a sixth embodiment of the present invention, in which FIG. 35(a) is a cross sectional view showing the locking plate and FIG. 35(b) is a cross sectional view showing the bobbin;

FIGS. 38(a) and (b) are explanatory views showing the operation of the energy absorption mechanism for the bobbin and the locking plate shown in FIG. 9;

FIG. 39 is a graph showing the relationship between the amounts of the webbing which are drawn out and energy absorption loads according to a sixth embodiment;

FIGS. 51(a) and 51(b) are explanatory views for explaining the explaining the operation of an energy absorption mechanism for the retractor for a seat belt shown in FIG. 48 in which FIG. 51(a) is a cross sectional view taken along lines J—J shown in FIG. 48 and FIG. 51(b) is a cross sectional view taken along line K—K shown in FIG. 48;

DETAILED DESCRIPTION OF THE PREFERRED EMBODIMENTS

Preferred embodiments of a retractor for a seat belt according to the present invention will now be described with reference to the drawings.

Figure 1:
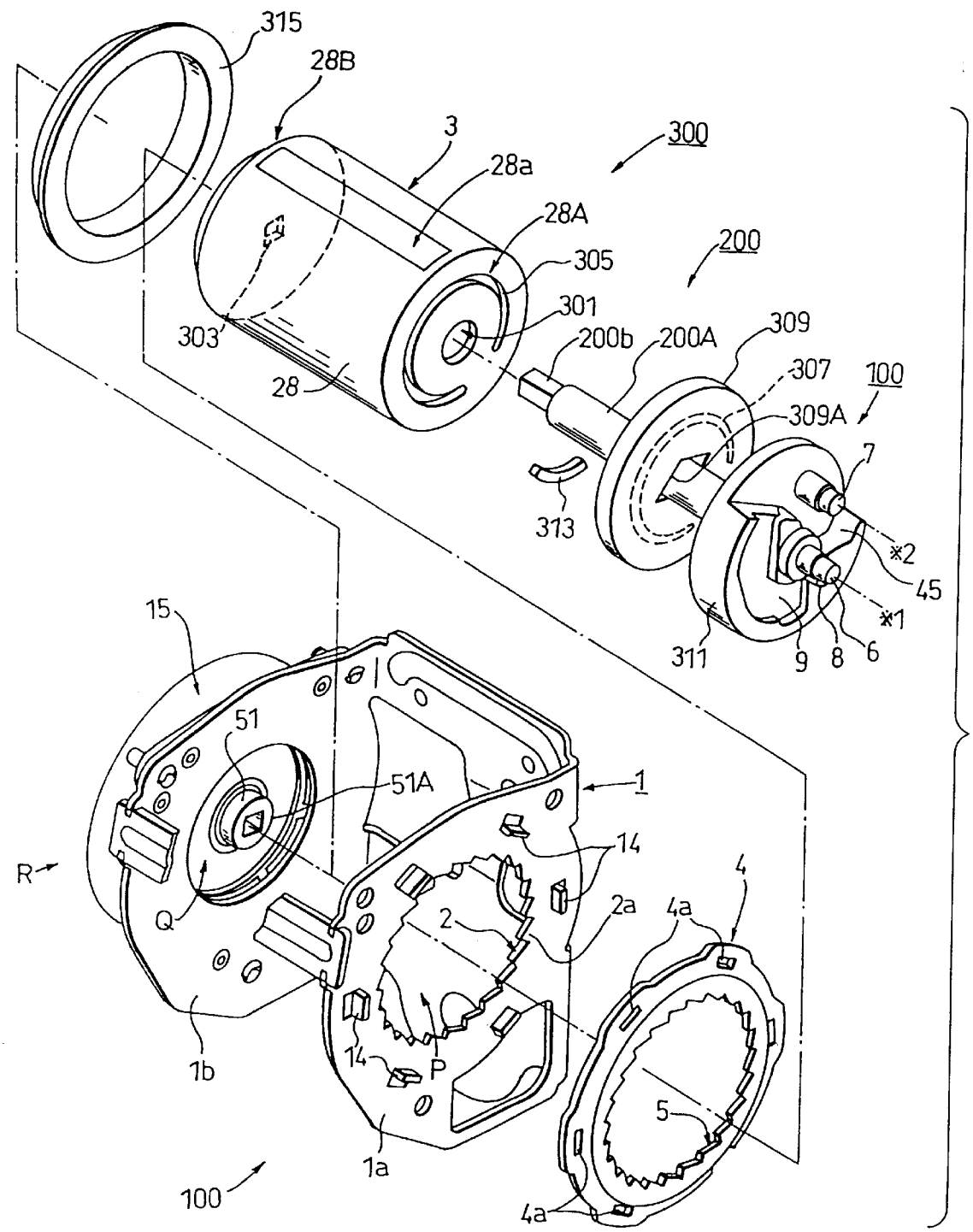
FIG. 1 is a portion of an exploded perspective view showing a retractor for a seat belt according to a first embodiment of the present invention.
Figure 2:
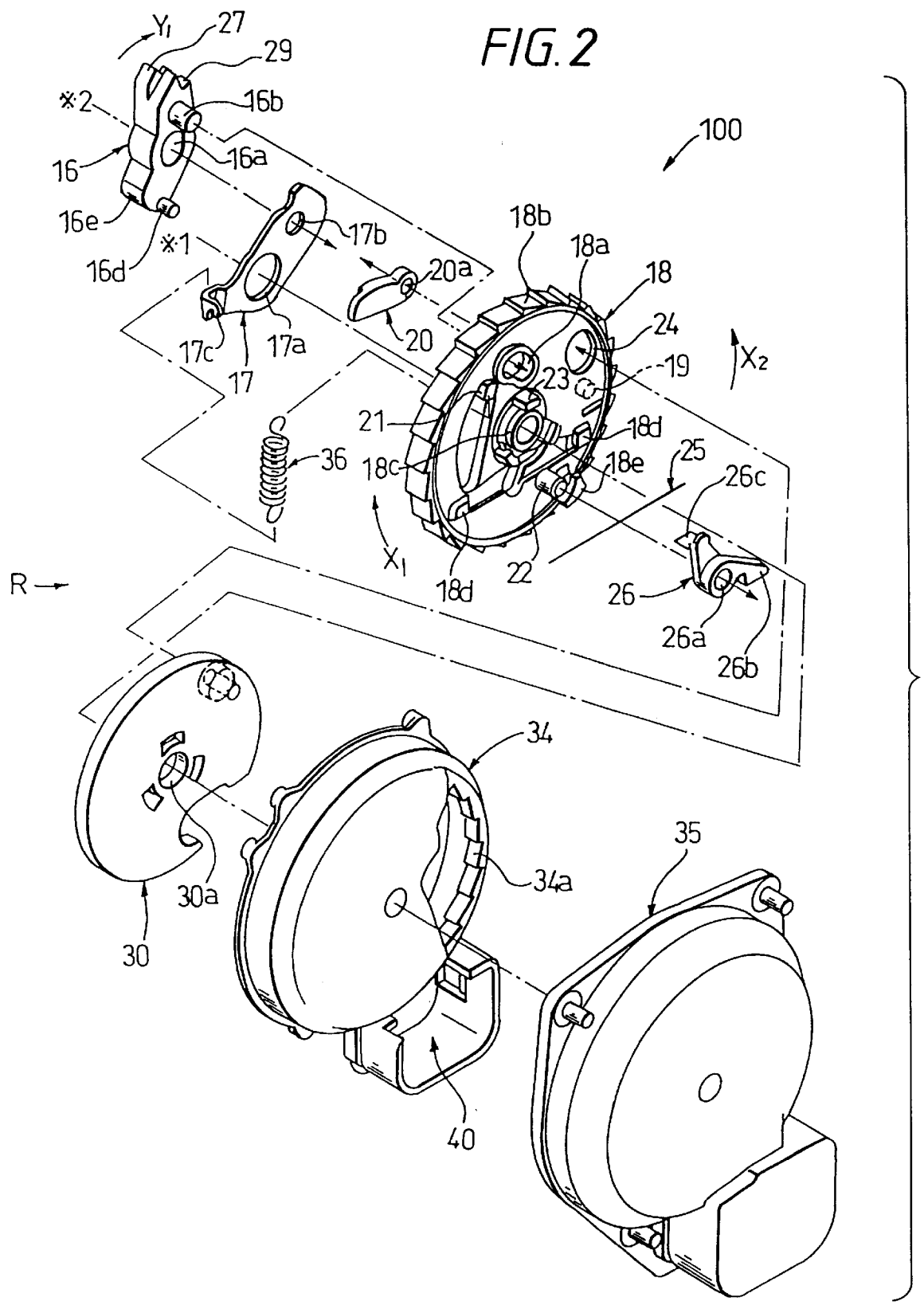
FIG. 2 is a an exploded perspective view showing a residual portion of the retractor for a seat belt shown in FIG. 1.
Figure 3:
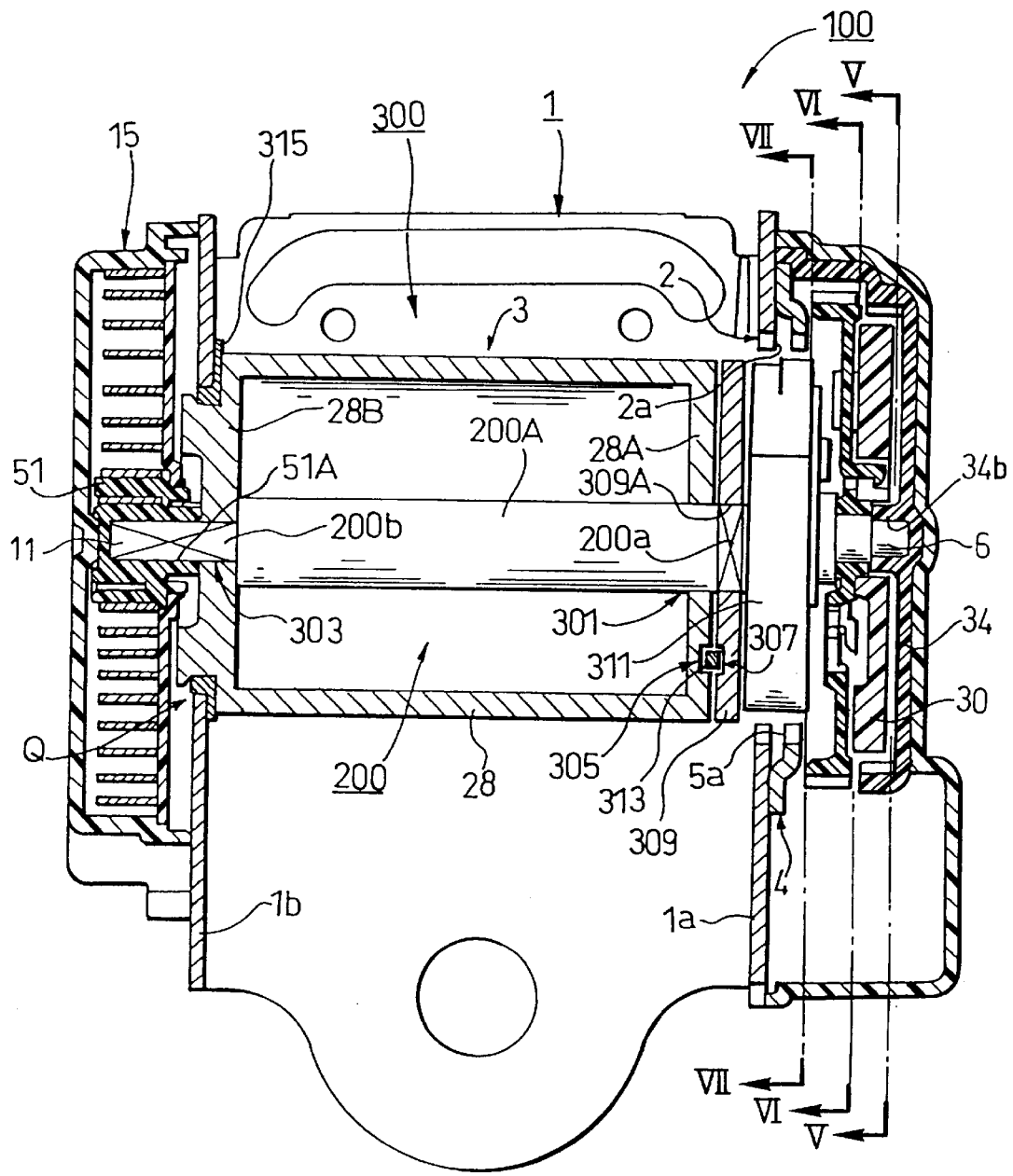
FIG. 3 is a vertical cross sectional front view of the retractor for a seat belt shown in FIG. 1.

FIGS. 1 and 2 are exploded perspective views showing a retractor R for a seat belt according to the present invention. FIG. 3 is a front and vertical cross sectional view showing the retractor R for a seat belt.

Note that FIGS. 1 and 2 show the divided structure of the retractor R for a seat belt for convenience.

As can be understood from FIGS. 1, 2 and 3, the retractor R for a seat belt is mainly composed of a locking means 100 which is an emergency locking mechanism, an energy absorption mechanism 200 mainly composed of a shaft (torsion bar) 200A permitted to be twisted around the axis thereof and a rotation restraining mechanism 300 for restraining the torsional angle of the torsion bar 200A.

Referring to FIGS. 1, 2 and 3, a major portion of a retractor base 1 is formed into a U-shape in a plane view. Opposite side plates 1a and 1b respectively have opposite through holes P and Q and rotatively support a bobbin 3, around which a webbing 50, to be described later, is-wound in such a manner that the bobbin 3 penetrates the through holes P and Q.

The through hole P provided for the side plate 1a has, on the inner edge thereof, a first-line engagement internal teeth 2. A substantially annular internally-toothed ratchet 4 is disposed on the outside of the through hole P. The internally-toothed ratchet 4 has, on the inner edge thereof, a second-line engagement internal teeth 5 having the same shape and the same number of teeth as those of the first-line engagement internal teeth 2.

In this case, the second-line engagement internal teeth 5 are, by a plurality of engagement projections 14 formed on the side plate 1a by a bending work and engagement hole 4a formed in the outer periphery of the internally-toothed ratchet 4, located and secured in such a manner that the positions of the teeth are relatively displaced in the circumferential direction from the first-line engagement internal teeth 2 by about ½ tooth.

That is, an engagement receiving-side portion arranged to be engaged to an engagement member (to be described later) in order to inhibit rotation of the bobbin 3 in a direction in which the webbing 50 is drawn out is formed by the first- and second-line engagement internal teeth 2 and 5.

The outer surface of the second-line engagement internal teeth 5 formed in the internally-toothed ratchet 4 is subjected to a drawing process so that an axial directional gap is formed between the first-line engagement internal teeth 2 and the second-line engagement internal teeth 5 when the internally-toothed ratchet 4 has been secured to the outer surface of the side plate 1a. On the other hand, a known wind-up spring unit 15 is disposed at an end of the bobbin 3 adjacent to the side plate 1b so that the bobbin 3 is always urged in a direction in which the webbing 50 is wound up.

The bobbin 3 is a component of the rotation restraining mechanism 300 and formed integrally into a substantially cylindrical shape by combining aluminum alloy or copper and resin. A body portion 28 around which the webbing 50 is wound to serve as a wind-up shaft for the webbing 50 has a slit opening 28a penetrating the body portion 28 in the radial direction of the same in order to permit an end of the webbing 50 to penetrate and to hold the same.

The body portion 28 has, at the two ends in the axial direction thereof, disc-like closing plates 28A and 28B. Each of the closing plates 28A and 28B has a round hole 301 and a rectangular hole 303. Moreover, the closing plate 28A has a guide portion 305 in the form of a C-shape groove having a bottom in the outer periphery thereof.

Figure 10:
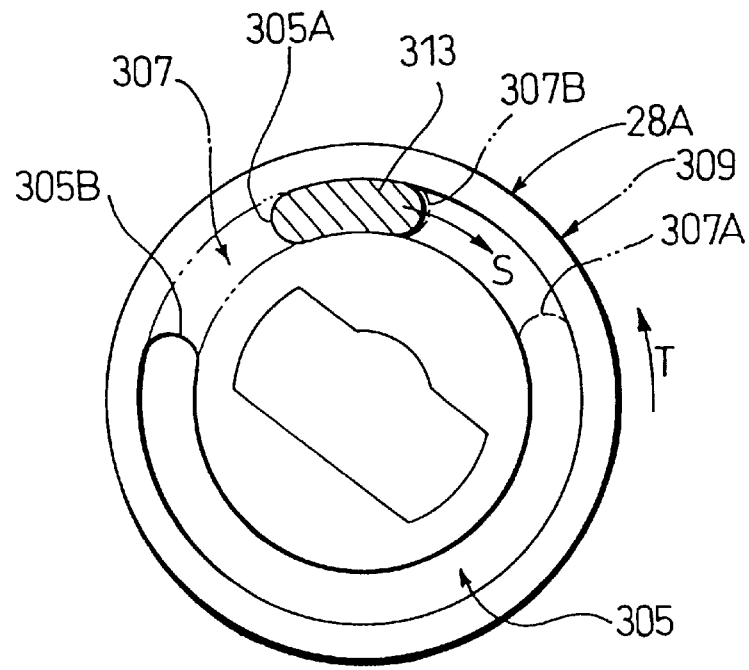
FIG. 10 is a view of explanatory showing a state of sliding of a lock piece in a guide portion provided for a closing plate of a bobbin.

As can be understood from FIG. 10, the distance from an end 305A of the guide portion 305 to another end 305B of the same is, in this embodiment, made to be ¾ of the circumference of the closing plate 28A. Note that the distance may arbitrarily be selected.

A disc-like lock plate 309 having a guide portion 307 formed into a C-shape groove having a bottom on the side opposite to the guide portion 305 is disposed adjacent to the closing plate 28A. The lock plate 309 has, at the center thereof, a rectangular hole 309A formed in the direction of the thickness thereof. Moreover disc-like plate 311 is disposed on the outside of the lock plate 309, the disc-like plate 311 having projecting rotation support shafts 6 and 11 for rotatively supporting the bobbin 3 and a projecting support shaft 7 with which a pole 16 serving as an engagement member capable of engaging to the first- and second-line engagement internal teeth 2 and 5 is movably borne. The lock plate 309 and the plate 311 form a locking member.

As can be understood from FIG. 10, the distance from an end 307A of the guide portion 307 to another end 307B of the same is, in this embodiment, made to be ¾ of the circumference of the lock plate 309. Note that the distance may arbitrarily be selected. The lock plate 309 may be formed integrally with the plate 311 to form the guide portion into a groove having a bottom.

A structure may preferably be employed in which either the guide portion 305 or the guide portion 307 is formed. In this case, a lock piece 313, to be described later, is secured to a member for which the guide portion is not provided. Also a structure may preferably be employed in which the guide portion 305 and the guide portion 307 are formed to penetrate the closing plate 28A and the lock plate 309 in the direction of their thickness.

The plate 311 has a function for locating the end of the pole 16 on the rocking side and an opposite pole 16e (see FIG. 2) when the pole 16 has been rocked in a direction in which it is engaged to the first- and second-line engagement internal teeth 2 and 5 and for bearing a load between the first- and second-line engagement internal teeth 2 and 5 if a great load is applied to the pole 16.

Each of the rotation support shafts 6 and 11 of the plate 311 is rotatively borne by a bearing portion 34b of a gear case 34, to be described later, and a retainer 51 which serves as a wind-up shaft for the wind-up spring unit 15.

A ring-shape bearing bush 315 is disposed adjacent to the closing plate 28B. The bearing bush 315 is inserted into a circular opening Q in the side plate 1b of the retractor base 1.

An axial directional end of a cylindrical (rod shape) torsion bar 200A is secured to the surface of the plate 311 opposite to the surface over which the rotation support shafts 6 and 11 project. Two axial-directional ends 200a and 200b of the torsion bar 200A are formed into rectangular rods designed to have sizes permitting press fitting into the rectangular holes 303 and 309A. The projecting rectangular column portion 200b is received by the rectangular hole 303 and received and secured into a rectangular hole 51A formed in the retractor base 1 of the wind-up spring unit 15.

Since the energy absorption mechanism mainly composed of the torsion bar 200A is interposed, the torsion bar 200A can be twisted around the axis thereof to rotate the bobbin 3 if a load is further applied (in a direction in which the bobbin 3 is rotated) to the locking means 100 including the disc-like plate 311 in a case where drawing out of the webbing 50 has been inhibited by a locking means to be described later. Therefore, the webbing 50 can furthermore be drawn out. Even in a state where drawing out of the webbing 50 is being inhibited by the locking means, shock from the webbing 50 to the passenger can be absorbed.

As can be understood from FIG. 3, in a state where the plate 311 (the torsion bar 200A), the lock plate 309, the lock piece 313, the bobbin 3 and the bearing bush 315 have been assembled to the retractor base 1, the two axial directional ends 200a and 200b of the torsion bar 200A have been press-fitted into the rectangular holes 303 and 309A. Therefore, the bobbin 3 and the lock plate 309 are rotated integrally with the plate 311.

As can be understood also from FIG. 10, the guide portion 305 is provided with the lock piece 313 having a curvature corresponding to that of the guide portion 305 and made slidable along the inner surface of the guide portion 307. A rotation restraining mechanism 300 according to this embodiment is mainly formed by the bobbin 3, the guide portions 305 and 307 and the lock piece 313.

The plate 311 is provided with an engagement projection 8 for restraining the counterclockwise rotation of a rocking lever member 20 movably borne with respect to a ratchet wheel 18 forming a locking means 100 to be described later. Moreover, a recess 9 is formed to prevent interference of a tension coil spring 36 for urging the ratchet wheel 18 to rotate in a direction in which the webbing is drawn out and an arm portion 26c of a lock arm 26 for pressing a sensor spring 25 to be later. Moreover, the plate 311 and the lock plate 309 may be formed integrally and a C-shape groove having a bottom may be formed in the side surface of the disc-like plate 311 facing the bobbin.

Figure 4A:
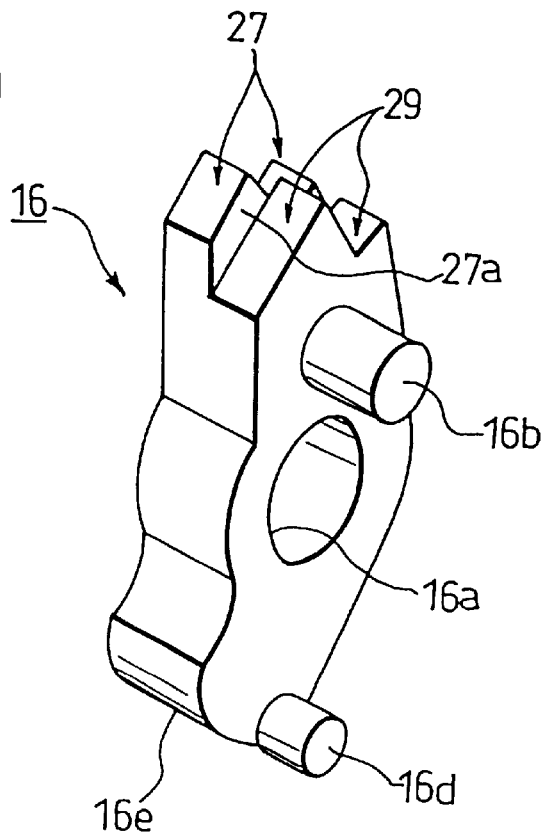
FIG. 4(*a*) is a perspective view showing the pole shown in FIG. 1 adjacent to the sensor and FIG. 4(*b*) is a perspective view showing the pole in the retractor.
Figure 4B:
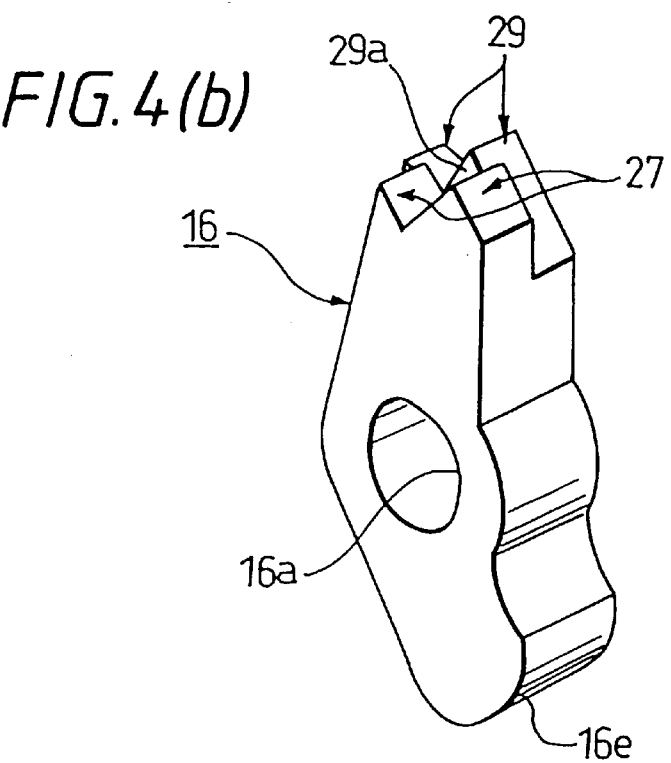

As can be understood from FIGS. 4(a) and 4(b), first-line engagement teeth 27, which are engagement members capable of engaging to the first-line engagement internal teeth 2, and second-line engagement teeth 29, which are engagement members capable of engaging to the second-line engagement internal teeth 5, are integrally formed at a rocking end of the pole 16. The teeth of first- and second-line engagement teeth 27 and 29 are respectively displaced by about ½ tooth in the circumferential direction.

A shaft hole 16a arranged to freely receive the support shaft 7 penetrates the central portion of the pole 16. An engagement projection 16b formed adjacent to the rocking end and a pressing projection 16d formed adjacent to a pole rear end 16e are formed to project over the side surface of the pole 16 facing the sensor. That is, since the shaft hole 16a movably receives the support shaft 7, the pole 16 is borne by the support shaft 7 in such a manner that the pole 16 is able to rotate and relatively move for a predetermined distance with respect to the support shaft 7. Since the leading end of the support shaft 7, which has penetrated the shaft hole 16a of the pole 16, is stopped in the engagement hole 17b of the holding plate 17 having a through hole 17a into which the rotation support shaft 6 of the bobbin 3 is inserted, upward loosening of the pole 16 from the end surface of the bobbin 3 can be prevented by the holding plate 17.

An end of the engagement projection 16b of the pole 16 is inserted into a cam hole 18a of the ratchet wheel 18 disposed on the outside of the holding plate 17 and rotatively supported by the rotation support shaft 6 of the bobbin 3. Thus, when the ratchet wheel 18 is relatively rotated with respect to the bobbin 3 in a direction in which the webbing is wound up (a direction indicated by an arrow X1 shown in FIG. 2), the cam hole 18a moves the end of the engagement projection 16b in a radial direction from the rotation central shaft of the bobbin 3. Therefore, the pole 16 is rocked around the support shaft 7 in a direction (in a direction indicated by an arrow Y1 shown in FIG. 2) in which engagement with the first- and second-line engagement internal teeth 2 and 5 provided for the side plate 1a is established.

That is, the locking means 100 is formed which is structured such that the pole 16 is rocked in the direction in which the engagement with the first- and second-line engagement internal teeth 2 and 5 is established and first-line and second-line engagement teeth 27 and 29 of the pole 16 are simultaneously engaged to the first- and second-line engagement internal teeth 2 and 5 so that rotation of the bobbin 3 in the direction in which the webbing is drawn out is inhibited.

As can be understood from FIG. 3, since the gap is formed in the bobbin axial direction between the first-line engagement internal teeth 2 and the second-line engagement internal teeth 5 as can be understood from FIG. 3, location of the pole 16 with respect to the retractor base 1 in the bobbin axial direction can be performed with a satisfactory large allowance.

Therefore, even if a satisfactory machining dimensional accuracy of the pole 16 and the bobbin 3 or a satisfactory assembling accuracy cannot be obtained, the first- and second-line engagement teeth 27 and 29 of the pole 16 are able to reliably be engaged to the first- and second-line engagement internal teeth 2 and 5.

Note that the pole 16 can be manufactured by sintering, forging or diecast as well as a machining work.

The ratchet wheel 18 is a toothed wheel having a central hole rotatively supported by the rotation support shaft 6. The ratchet wheel 18 has, on the outer surface thereof, ratchet teeth 18b which are engaged to a sensor arm 43 of a vehicle acceleration sensitive means 41 (see FIG. 5). A boss portion 18c, formed to project over the edge of the central hole of the ratchet wheel 18 toward the outside portion of the retractor, rotatively supports a central hole 30a of an inertia plate 30 which is a disc-like inertia body forming the webbing acceleration sensitive means which is an inertia sensitive means for detecting the acceleration of the operation for drawing out the webbing.

An engagement claw portion 23 formed to project over the outer surface of the boss portion 18c is located in the thrusting direction of the inertia plate 30. Moreover, an engagement projection 31 of the inertia plate 30 is engaged to an elongated hole 24 formed in the ratchet wheel 18. Thus, an edge 24a (see FIG. 6) of the elongated hole 24 locates the inertia plate 30 in the direction of the rotation when the emergency locking mechanism is not operated.

The ratchet wheel 18 has, on the outer surface thereof, a shaft portion 22 for rotatively supporting the lock arm 26 and a holding projection 18e for preventing upward loosening of the lock arm 26 which are formed to project over the foregoing outer surface. The ratchet wheel 18 has, on the inner surface thereof, a spring hooking portion 21 for hooking another end of a tension coil spring 36 hooked to a hooking portion 17c of the holding plate 17. The tension coil spring 36 urges the ratchet wheel 18 to the bobbin 3 in a direction in which the webbing is drawn out (a direction indicated by an arrow X2). Moreover, the lock arm 26 has an arm portion 26c for pressing the lengthwise central portion of the linear-shape sensor spring 25 having two ends supported by a pair of hook portions 18d formed on the outer surface of the ratchet wheel 18; and an engagement claw 26b capable of engaging to an internally-toothed gear 34a of the gear case 34.

The lock arm 26 forms an engagement means having the engagement claw 26b arranged to be engaged to the internally-toothed gear 34a to inhibit rotation of the ratchet wheel 18 in the direction in which the webbing is drawn out. The engagement claw 26b is, by the urging force of the sensor spring 25, pressed and urged to the pressing projection 32 of the inertia plate 30.

Note that the ratchet wheel 18 corresponding to the rocking range for the arm portion 26c has an opening so that the arm portion 26c penetrates the foregoing opening in order to assure the engagement state of the arm portion 26c to the sensor spring 25.

A rocking lever member 20 having a shaft hole 20a rotatively is supported by a support shaft 19 projecting over the inner surface of the ratchet wheel 18 so as to be capable of rocking. The rocking lever member 20 is assembled between the bobbin 3 and the ratchet wheel 18 in such a manner that the counterclockwise rotation is arbitrarily restrained by the engagement projection 8 formed on an end surface of the bobbin 3 facing the sensor. Moreover, a pressing projection 16d projecting over the side surface of the pole 16 facing the sensor is in contact between the support shaft 19 and the engagement projection 8 so that clockwise rotation is arbitrarily restrained.

On the other hand, the gear case 34 disposed on the outside of the inertia plate 30 has, in the central portion thereof, a bearing portion 34b for rotatively supporting the bobbin 3. The bottom surface of the bearing portion 34b serves as a surface for locating the bobbin 3 in the axial direction. Moreover, a box-like accommodation portion 40 for accommodating the vehicle acceleration sensitive means 41 serving as the inertia sensitive means for detecting the acceleration of the car body is formed below the gear case 34. A sensor cover 35 is disposed on the outside of the side plate 1a for covering the gear case 34.

The operation of the retractor R for a seat belt according to this embodiment having the above-mentioned structure will now be described.

Figure 6:
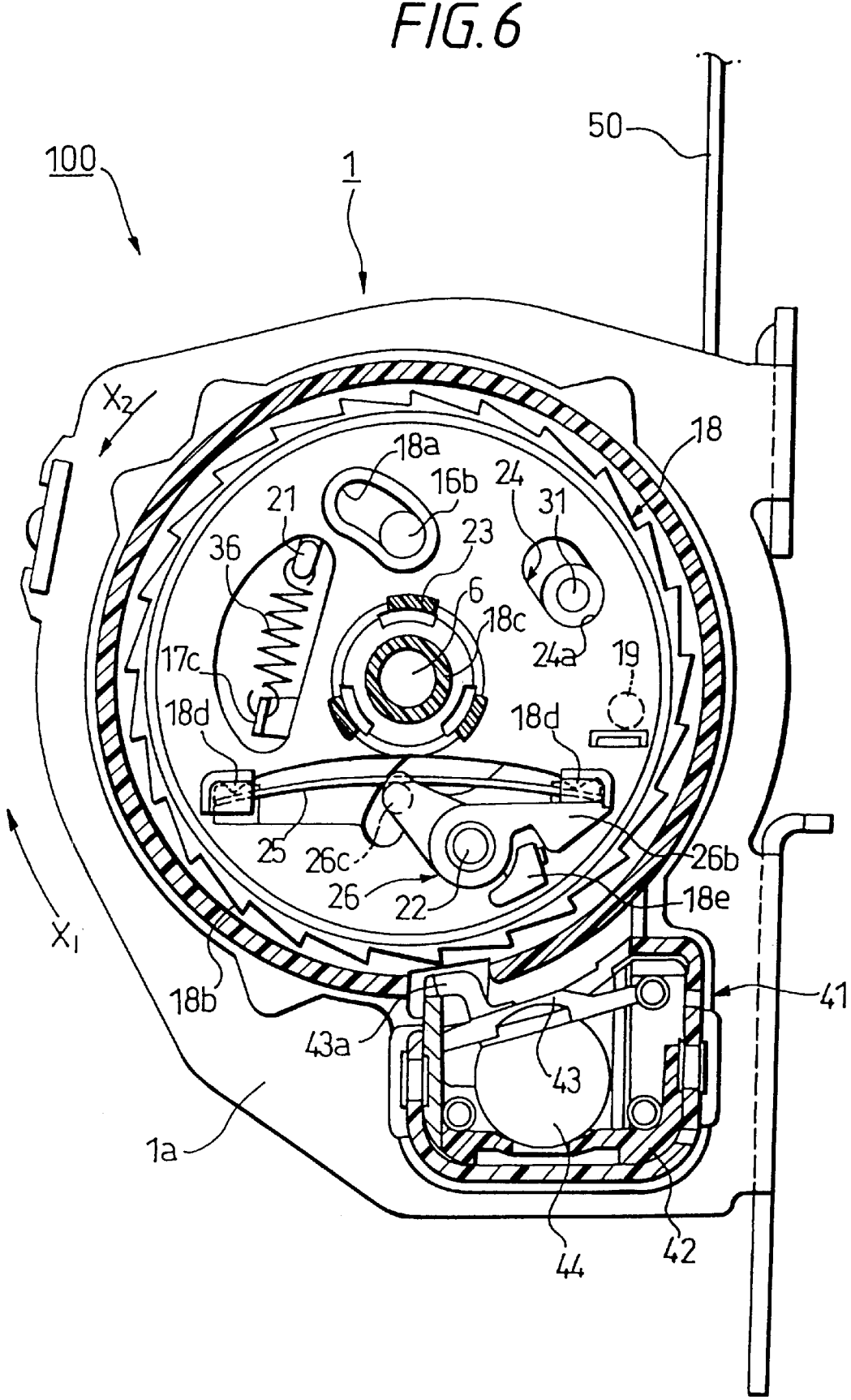
FIG. 6 is a cross sectional view taken along line VI—VI of the retractor for a seat belt shown in FIG. 3.
Figure 7:
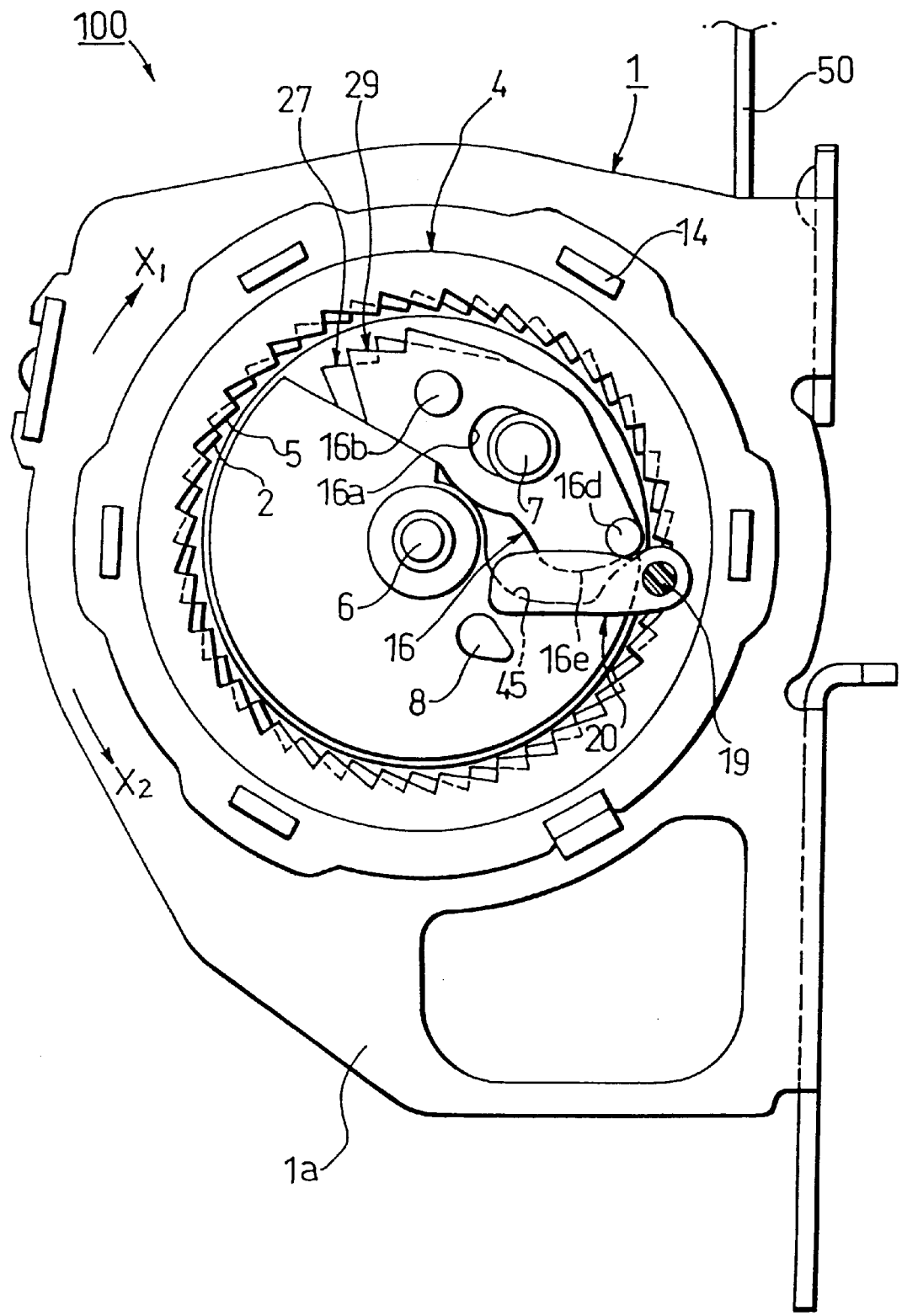
FIG. 7 is a cross sectional view taken along line VII—VII for explaining an operation for locking drawing out of the webbing of the retractor for a seat belt shown in FIG. 3.

In the locking means 100, the ratchet wheel 18 is, in a normal state of use and as can be understood from FIG. 6, urged with respect to the bobbin 3 in the direction (the direction indicated by the arrow X2), in which the webbing is drawn out, by the urging force of the tension coil spring 36 secured between the spring hooking portion 21 and the hooking portion 17c of the holding plate 17. Since the pole 16 having the engagement projection 16b capable of engaging to the cam hole 18a is urged in a direction in which it does not engage to the first- and second-line engagement internal teeth 2 and 5 (see FIG. 7), the bobbin 3 is able to rotate. Thus, the webbing 50 can freely be drawn out.

In a case where a ball weight 44 of a vehicle acceleration sensitive means 41 is mounted on a predetermined position of the sensor case 42, the engagement projection 43a of the sensor arm 43 is not engaged to the ratchet teeth 18b of the ratchet wheel 18. Thus, the ratchet wheel 18 rotates to follow the rotation of the bobbin 3. The engagement claw 26b of the lock arm 26 of the webbing acceleration sensitive means is, by the urging force of the sensor spring 25, urged to a position at which it is not engaged to the internally-toothed gear 34a of the gear case 34.

Figure 5:
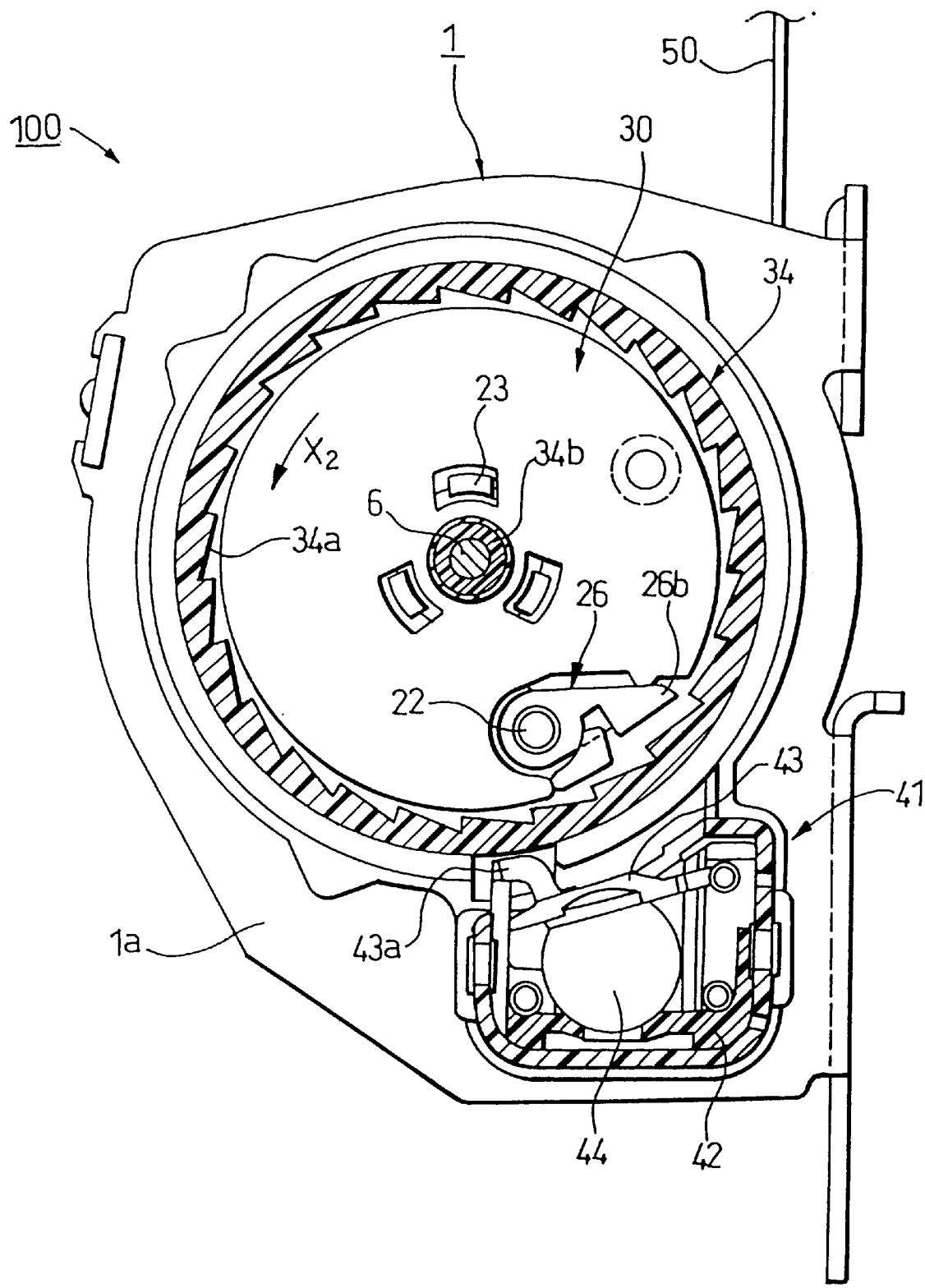
FIG. 5 is a cross sectional view taken along line V—V of the retractor for a seat belt shown in FIG. 3.

As can be understood from FIGS. 5 and 6, the engagement projection 31 of the inertia plate 30, which is, by the engagement claw 26b, being urged with respect to the ratchet wheel 18 in the direction (direction indicated by the arrow X2), in which the webbing is drawn out, is pressed and urged to the end 24a of the elongated hole 24 so that the position of the inertia plate 30 in the rotational direction is located. Thus, it is rotated integrally with the bobbin 3 through the ratchet wheel 18.

As a result, when the vehicle acceleration sensitive means 41, which is the inertia sensitive means, or the webbing acceleration sensitive means is operated in an emergency, such as collision, the sensor arm 43 or the lock arm 26 of the lock operation means inhibits the rotation of the ratchet wheel 18 in the direction in which the webbing is drawn out so that the locking means of the retractor is operated.

If the webbing 50 is furthermore drawn out from the retractor after the vehicle acceleration sensitive means 41 or the webbing acceleration sensitive means has been operated to inhibit the rotation of the ratchet wheel 18 in the direction in which the webbing is drawn out, the rotation of the ratchet wheel 18 is delayed as compared with the bobbin 3 so that the ratchet wheel 18 is relatively rotated in the direction (direction indicated by the arrow X1) in which the webbing is wound up.

Since the above-mentioned relative rotation causes the cam hole 18a of the ratchet wheel 18 to outwardly move the engagement projection 16b of the pole 16 from the rotation central shaft of the bobbin 3 in the radial direction, the pole 16 is rocked relative to the support shaft 7 in a direction in which the engagement with the first- and second-line engagement internal teeth 2 and 5 is established. If the webbing 50 is furthermore drawn out from the retractor, engagement between the first-line and second-line engagement teeth 27 and 29 of the pole 16 and the first- and second-line engagement internal teeth 2 and 5 is completed, as shown in FIG. 8.

Since a gap is formed between the pole rear end 16e of the pole 16 and a pressure receiving surface 45 of the bobbin 3, the rotation of the rocking lever member 20 is restrained by the engagement projection 8 of the bobbin 3 and the pressing projection 16d of the pole 16 with substantially no loosening.

Since the shaft hole 16a of the pole 16 movably receives the support shaft 7 of the bobbin 3 in such a manner that it is capable of rocking and relatively movable for a predetermined distance with respect to the bobbin 3, further drawing out of the webbing 50 from the retractor causes the pole 16 to be relatively rotated around the rotation central shaft of the bobbin 3 until the pole rear end 16e comes in contact with the pressure receiving surface 45. At this time, the pressing projection 16d of the pole 16 has a stationary positional relationship with the side plate 1a. However, the engagement projection 8 of the bobbin 3 is rotated in the direction (the direction indicated by the arrow X2) in which the webbing is drawn out.

Figure 8:
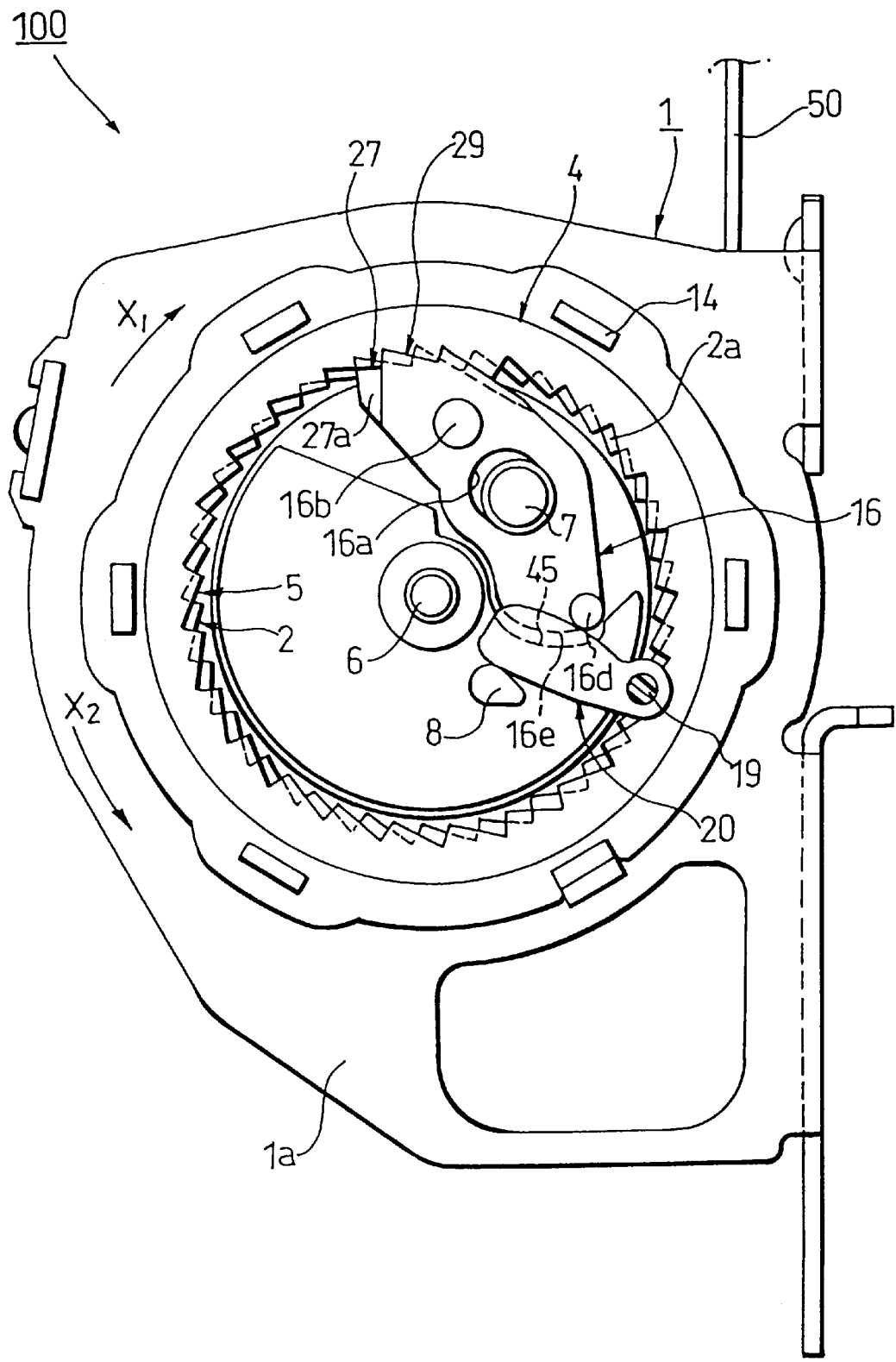
FIG. 8 is a cross sectional view taken along line VII—VII for explaining an operation for locking drawing out of the webbing of the retractor for a seat belt shown in FIG. 3.
Figure 9:
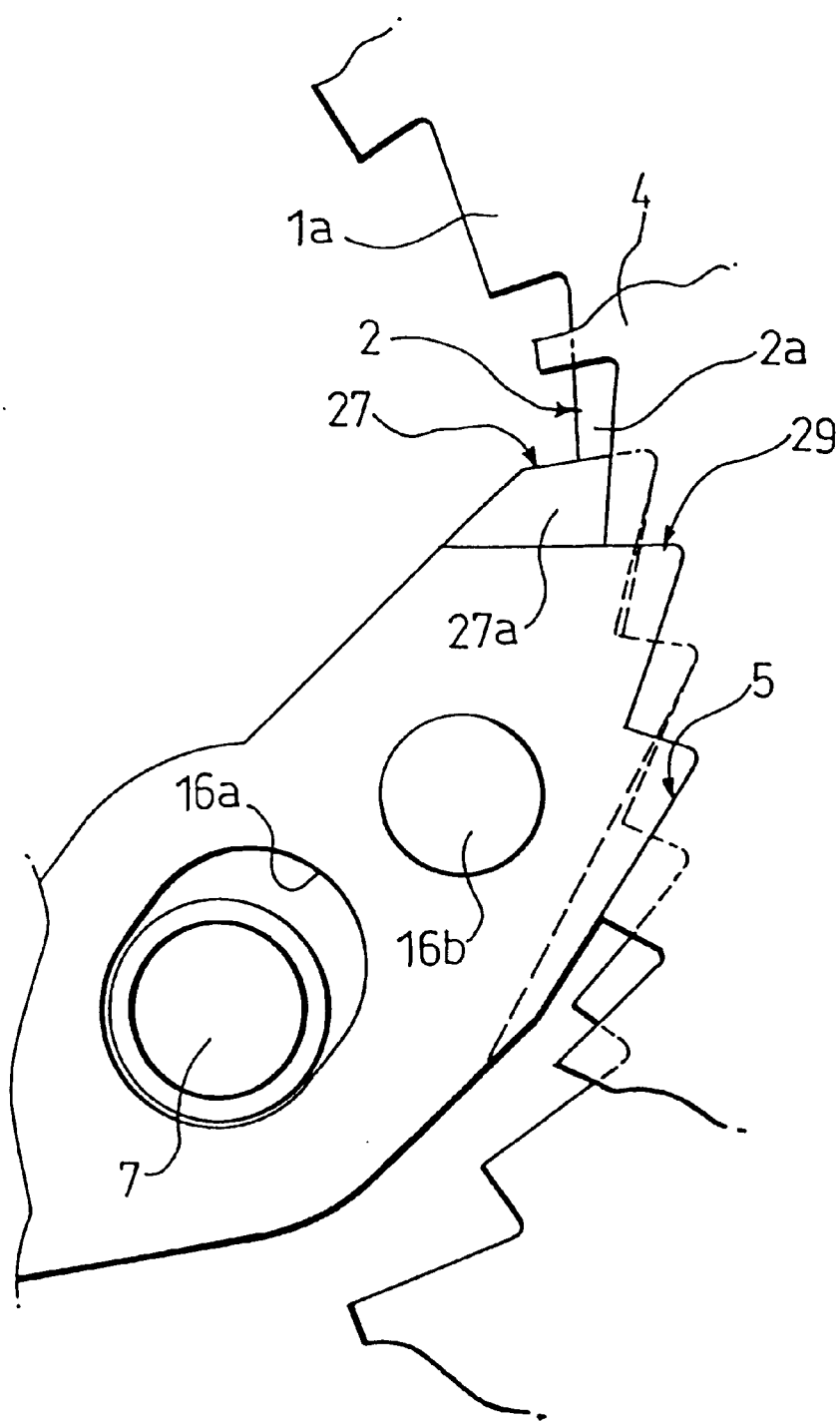
FIG. 9 is an enlarged view showing an essential portion for explaining a state of engagement of the pole shown in FIG. 8.

As a result of the foregoing operation, the rocking end of the rocking lever member 20 is pressed by the engagement projection 8 such that the contact point with the pressing projection 16d is made to be the rotation support point so as to be rocked and rotated clockwise when viewed in FIG. 8. When the rocking lever member 20 is rocked and rotated clockwise when viewed in FIG. 8 such that the contact point with the pressing projection 16d is made to be the rotation support point, the shaft hole 20a rotatively supported by the support shaft 19 of the ratchet wheel 18 is rotated with respect to the rotation central axis of the bobbin 3 in the direction (the direction indicated by the arrow X1) in which the webbing is wound up. As a result, the ratchet wheel 18 is inversely rotated in the direction (the direction indicated by the arrow X1) in which the webbing is wound up with respect to the bobbin 3.

Therefore, even in a state of locking in which the vehicle acceleration sensitive means 41 or the webbing acceleration sensitive means has been operated and thus the locking means of the retractor inhibits the rotation of the bobbin 3 in the direction in which the webbing is drawn out, the ratchet wheel 18, the rotation of which has been inhibited in the direction in which the webbing is drawn out, is able to make sensor arm 43 of the vehicle acceleration sensitive means 41 or the lock arm 26 of the webbing acceleration sensitive means to be free from engagement with the internally-toothed gear 34a f the gear case 34.

If a high tension (a load for rotating the bobbin 3 in the direction in which the webbing 50 is drawn out) is applied to the webbing 50 in the above-mentioned state where the pole 16 is being locked, the bearing portion 34b of the gear case 34 and the portion for supporting the retainer 51 of the wind-up spring unit 15 are deformed. Thus an upward moving force acts on the bobbin 3 when viewed in FIG. 1.

At this time, since the plate 311 is brought into contact with the first- and second-line engagement internal teeth 2 and 5 and the closing plate 28B of the bobbin 3 is brought into contact with the bearing bush 315, the movement of the bobbin 3 is inhibited. Thus, the tension acting on the webbing 50 is received by the foregoing members.

If a higher tension is applied to the webbing 50 in the above-mentioned state, the torsion bar 200A is twisted around the axis thereof. Therefore, the bobbin 3 is rotated so that the webbing 50 is drawn out and therefore, the energy absorption mechanism is operated. At this time, the guide portions 305 and 307 and the lock piece 313 restrain the rotational angle of the bobbin 3 to a predetermined angular degree.

Figure 11:
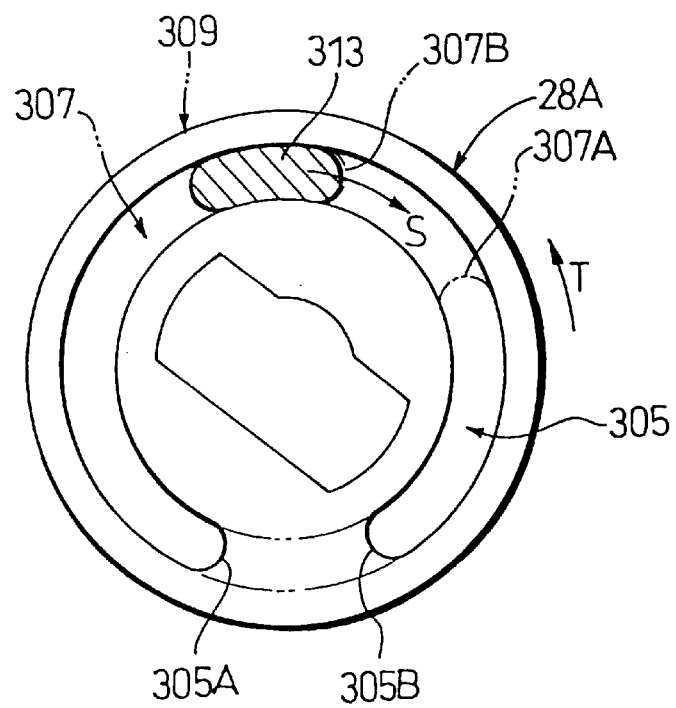
FIG. 11 is an explanatory view showing a state of sliding of the lock piece in the guide portion provided for the closing plate of the bobbin.

That is, in a state where loading of a higher tension to the webbing 50 starts (a state shown in FIG. 10), the lock piece 313 slides in the guide portion 305. Thus, the bobbin 3 is rotated in a direction indicated by an arrow T (see FIG. 11) for an angular degree corresponding to the length (¾ rotation) of the guide portion 305. As a result, the lock piece 313 is relatively moved in the direction indicated by an arrow S.

Figure 12:
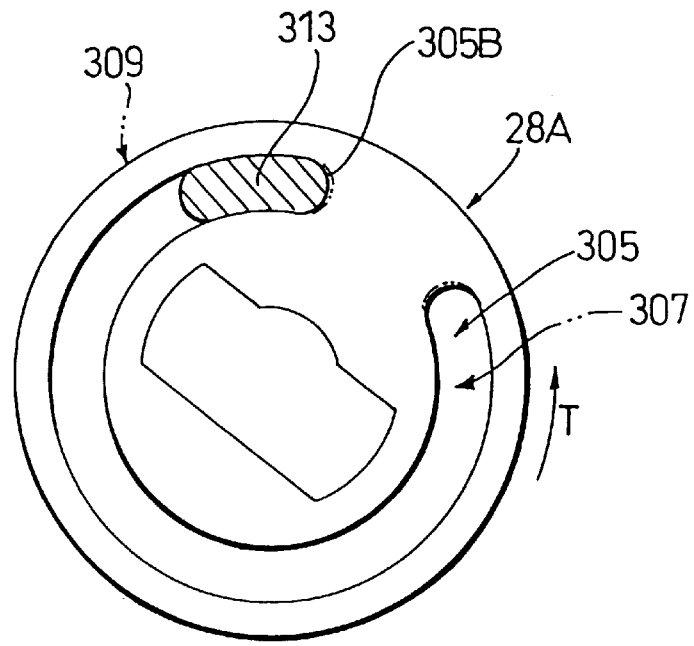
FIG. 12 is an explanatory view showing a state of sliding of the lock piece in the guide portion provided for the closing plate of the bobbin.
Figure 13:
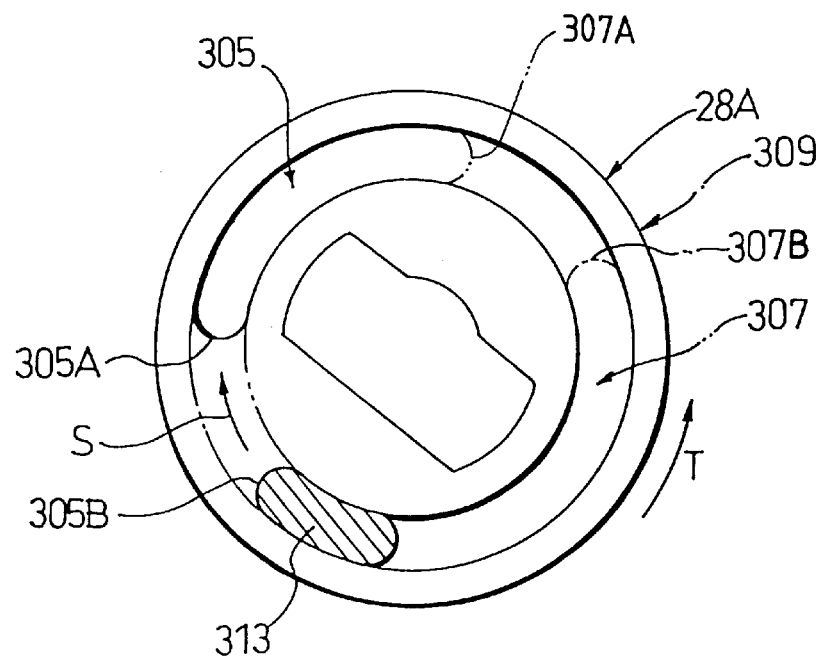
FIG. 13 is an explanatory view showing a state of sliding of the lock piece in the guide portion provided for a plate.
Figure 14:
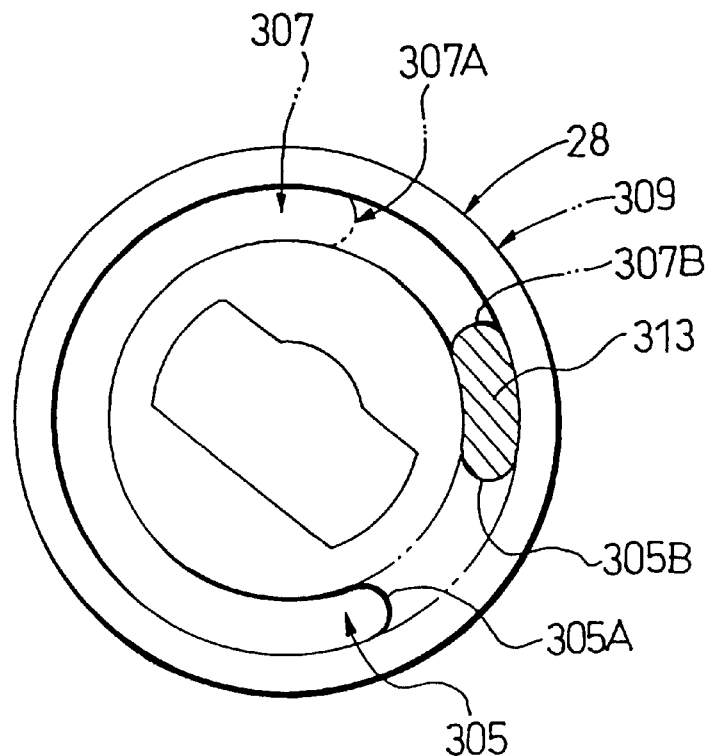
FIG. 14 is an explanatory view showing the state of sliding of the lock piece in the guide portion provided for the plate.

When the lock piece 313 has been moved to a start position 305A of the guide portion 305 to an end position 305B (a state shown in FIG. 12), the lock piece 313 starts moving together with the closing plate 28A from a start position 307A in the guide portion 307 provided for the plate 309. As a result, further rotation of the bobbin 3 is enabled (a state shown in FIG. 13).

When the lock piece 313 has therefore been moved to the end position 307B of the guide portion 307, torsion of the torsion bar 200A is inhibited. As a result, the rotation of the bobbin 3 is restrained (the rotation restraining means) in a state where it has been rotated by an angle corresponding to the length of the guide portion 305 and that of the guide portion 307, that is, an angle corresponding to (1.5) rotations in this embodiment.

When the vehicle has been stopped and the tension applied to the webbing 50 has been removed, the ratchet wheel 18 is rotated with respect to the bobbin 3 in the direction indicated by the arrow X2 by the urging force of the tension coil spring 36 because the engagement between the ratchet wheel 18 and the sensor arm 43 or the internally-toothed gear 34a of the gear case 34 of the lock arm 26 has been suspended. Therefore, the cam hole 18a of the ratchet wheel 18 moves the engagement projection 16b of the pole 16 toward the rotation central axis of the bobbin 3.

Since the tension in the drawing out direction applied to the webbing 50 has been suspended at this time and thus the bobbin 3 is able to rotate in the direction (the direction indicated by the arrow X1) in which the webbing is wound up, rotation of the bobbin 3 in the direction indicated by the arrow X1 to a state where the leading ends of the first- and second-line engagement teeth 27 and 29 of the pole 16 do not interfere with the leading ends of the first- and second-line engagement internal teeth 2 and 5 causes the pole 16 to be rocked and rotated around the support shaft 7 in the direction in which the engagement with the first- and second-line engagement internal teeth 2 and 5 is suspended. Thus, locking of the bobbin 3 is suspended and the webbing can arbitrarily be drawn out.

As described above, the retractor R for a seat belt according to this embodiment has the structure such that the rotation of the bobbin 3 is temporarily inhibited by the locking means 100 of the retractor. If the locking means 100 is applied with a load larger than the load thereof, the bobbin 3 is rotated to correspond to the torsion of the torsion bar 200A. Thus, the webbing 50 can be drawn out so as to serve as the energy absorption mechanism.

The state where the webbing 50 can be drawn out is controlled such that the rotation restraining mechanism arranged to cause the lock piece 313 to slide in the guide portion 305 and the guide portion 307 restrains the rotation of the bobbin 3 to (1.5) rotations corresponding to a predetermined angle. Therefore, even if a load for excessively twisting the torsion bar 200A is applied in an emergency of the vehicle, the amount of the webbing 50 which can be drawn out is restrained to an appropriate amount. Therefore, safety can be assured during driving of the vehicle. Since the shape of the end portion of the opening in the guide portion 305 and the guide portion 307 is formed into the C-shape and the rotational angle of the bobbin 3 is determined to correspond to the lengths of the guide portion 305 and the guide portion 307, the most appropriate rotation restraining mechanism can be arranged to correspond to the type and running performance of the vehicle, for example, a common passenger car or a large-size vehicle. Thus, safety can furthermore appropriately be secured during driving of the vehicle.

Since the shapes of the guide portion 305 and guide portion 307 enable the restrained rotational angle of the bobbin 3 to arbitrarily be selected to be adaptable to the type and running performance of the vehicle whether the vehicle is a common passenger car or a large-size vehicle, an advantage can also be realized in that a further appropriate restrained rotational angle can be set.

Figure 15:
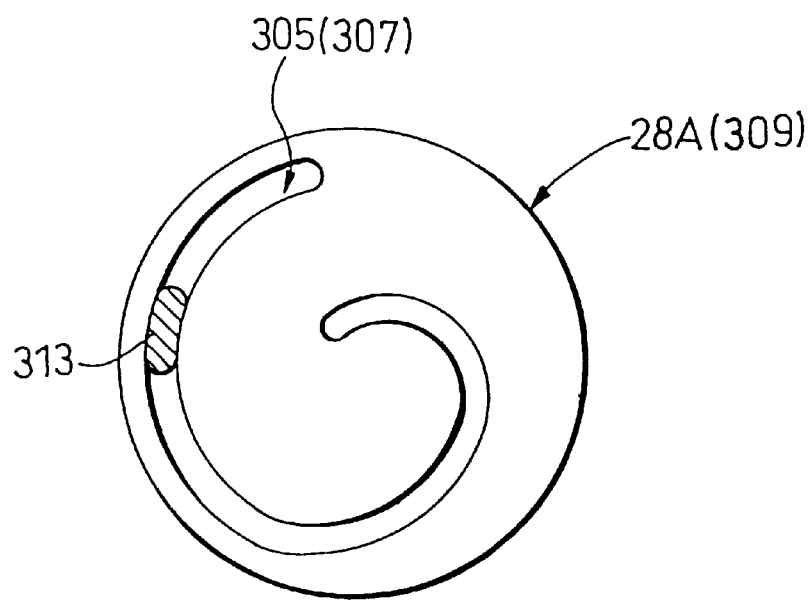
FIG. 15 is an explanatory view showing a second embodiment and is a schematic structural view showing the shape of a guide portion.

As can be understood from a second embodiment shown in FIG. 15, a structure may preferably be employed in which the guide portion 305 and the guide portion 307 are formed into spiral shapes to elongate the distance for which the lock piece 313 slides. Since the torsional angle (the rotational angle of the bobbin 3) of the torsion bar 200A can be determined to correspond to the determined distance for sliding, the foregoing structure can preferably be applied to, in particular, a large-size vehicle.

By combining rotational plates 316, the distance for which the lock piece 313 slides can finely be determined or the same can be elongated. Thus, the torsional angle of the torsion bar 200A can finely be adjusted in a stepped manner by the rotational plates 316.

The structure of the third embodiment using the rotational plate 316 will now be described. As can be understood from FIG. 16, the rotational plate 316 disposed adjacent to the bobbin 28 has two guide portions 314 and 315 at positions in the direction of the thickness thereof. The lock plate 309 disposed adjacent to the locking means 100 has one guide portion 307 on the side thereof opposite to the rotational plate 316. As can be understood from FIG. 16, the rotational plate 316 has a round hole 316B to movably receive the torsion bar 200 so as to be capable of relatively rotating with respect to the torsion bar 200. On the other hand, the lock plate 309 has a rectangular hole 309A so as to be pressfit into the torsion bar 200 so that the relative rotation with respect to the torsion bar 200 is inhibited.

Either of the lock pieces 313 (313') slides in a passage formed by the guide portion 305 provided for the closing plate 28A of the bobbin 28 and the guide portion 314 of the rotational plate 316 formed opposite to the guide portion 305. The other lock piece 313' (313) slides in a passage formed by the other guide portion 315 provided for the rotational plate 316 and the guide portion 307 provided for the lock plate 309 formed opposite to the other guide portion 315.

That is, since the two lock pieces 313, 313' are able to slide in the different passages, the bobbin 28 is able to rotate to correspond to the length which is the sum of the lengths of the passages. Thus, the rotational angle of the bobbin 28 can be enlarged as compared with the structure having one lock piece 313.

When the above-mentioned structure is arranged to comprise a plurality of the rotational plates 316 and have lock pieces disposed between the guide portions provided for each rotational plate, the restrained rotational angle of the bobbin 28 can furthermore be enlarged.

Figure 16:
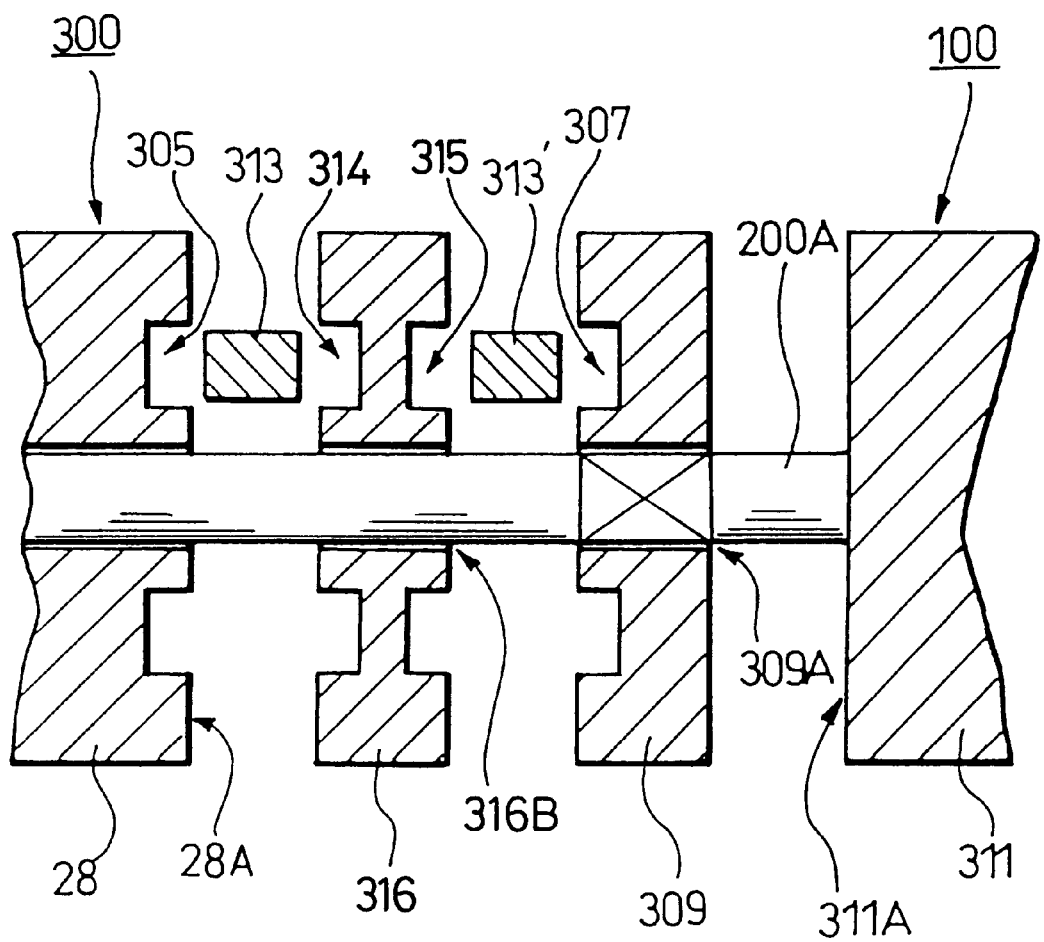
FIG. 16 is an explanatory view showing a third embodiment and is a schematic structural view showing a case where a plurality of lock plates are provided.

In a case where a plurality of lock pieces 313 and 313' are provided as shown in FIG. 16 so as to enlarge the rotational angle of the bobbin 28, a structure may preferably be employed in which the lock plate 309 adjacent to the locking means 100 is omitted and the guide portion 307 for sliding the other lock piece 313' is provided for a side surface 311A of the plate 311 forming the locking means 100 opposite to the bobbin 28.

The retractor R for a seat belt according to the first to third embodiments has the locking means 100 structured such that the pole 16 disposed at an end of the bobbin 3, around which the webbing 50 is wound, is engaged to the first- and second-line engagement internal teeth 2 and 5 of the side plate 1a to inhibit the rotation of the bobbin 3 in the direction in which the webbing is drawn out. The retractor R for a seat belt may be applied to a retractor for a seat belt having a structure in which a pair of engagement members are disposed at the two ends of the bobbin 3 and a non-engagement portions are provided for the two side plates 1a and 1b of the retractor base 1.

The inertia sensitive means, the locking operation means and the locking means are not limited to the shapes according to the foregoing embodiments and therefore various modifications are permitted. For example, a structure may be employed in which the inertia sensitive means which is operated in an emergency of the vehicle may comprise either the vehicle acceleration sensitive means or the webbing acceleration sensitive means. Moreover, the structure may arbitrarily be changed.

A fourth embodiment of the retractor for a seat belt according to the present invention will now be described with reference to FIG. 17 and following figures.

The third embodiment has the structure such that the bobbin 3 is restrained by the rotation restraining mechanism 300 and a required number of rotational plates 316 and a required number of lock pieces 313 are slidably provided for the rotation restraining mechanism 300 so as to permit the rotational angle of the bobbin 3 to be arbitrarily selected to be adaptable to the conditions including, for example, the size of the vehicle.

There sometimes arises a necessity of reducing the overall size of the retractor because of, for example, the condition of the allowed space for the retractor base 1. In this case, employment of the simple structure in which the number of the lock plates 309 is increased results in the rotation restraining mechanism 300 being elongated unintentionally, so that a desire to reduce the size is not satisfied.

Accordingly, the fourth embodiment, to be described below, employs a rotation restraining mechanism 300 also structured to reduce the size.

Figure 17:
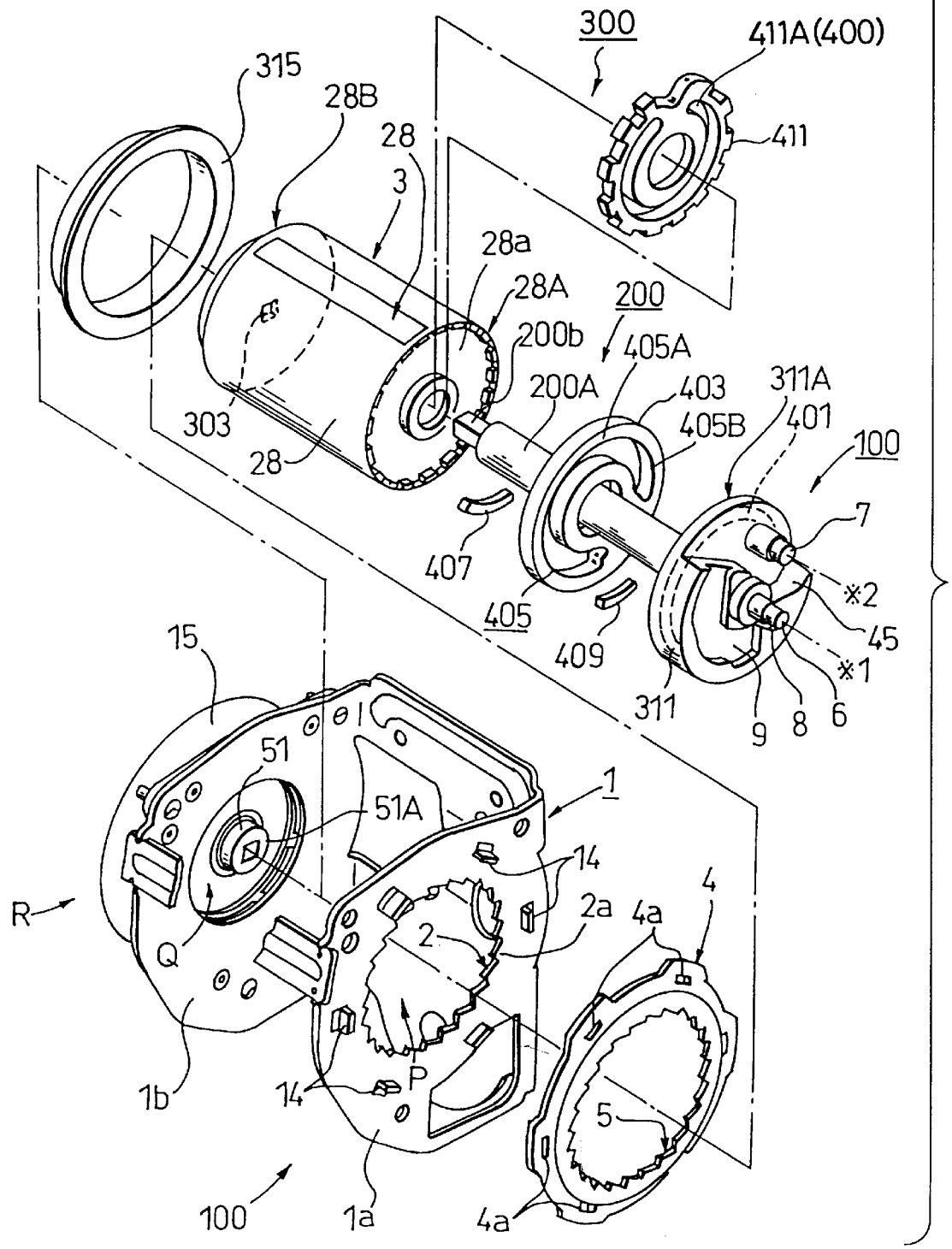
FIG. 17 is a partially omitted perspective view showing the overall structure according to a fourth embodiment.

That is, as can be understood from FIG. 17, this embodiment is structured such that the rotation restraining mechanism 300 has a first C-shape groove 400 provided for the bobbin 3. Moreover, the plate 311, which is a locking member forming the locking means 100, is provided with a second C-shape groove 401.

Note that same elements as those shown in FIG. 1 are given the same reference numerals in FIG. 17 and the same elements are omitted from description.

Between the bobbin 3 and the locking means 100, there is interposed a rotational plate 403. The rotational plate 403 has a first through hole 405A and a second through hole 405B having the same shapes as those of the first C-shape groove 400 and the second C-shape groove 401. The first through hole 405A and the second through hole 405B are communicated with each other to form one through hole 405.

A first lock piece 407 capable of sliding in a passage formed by the first C-shape groove 400 and the first through hole 405A is provided. Moreover, a second lock piece 409 is provided which is capable of sliding in a passage formed by the second C-shape groove 401 and the second through hole 405B.

Figure 18:
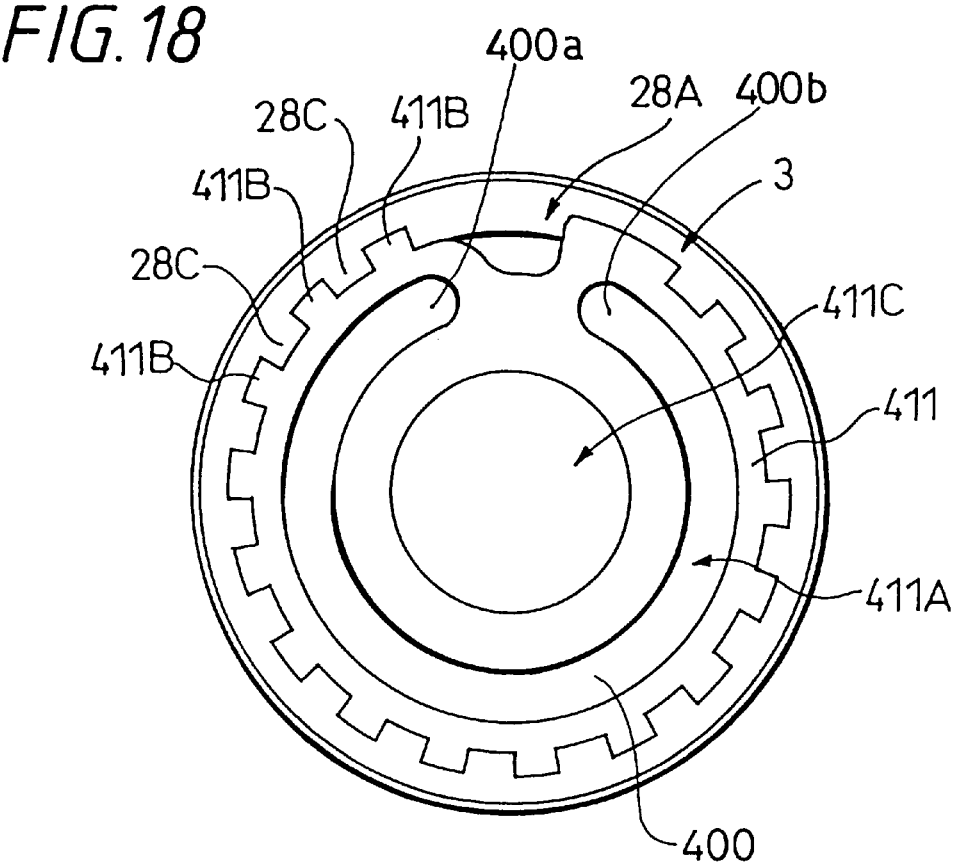
FIG. 18 is an explanatory view showing the structure of a first C-shape groove.

As can be understood from FIGS. 17 and 18, the first C-shape groove is formed by attaching the plate 411 to the closing plate 28A of the bobbin 3. The plate 411 has a C-shape through hole 411A having a shape corresponding to the outer shape of the bobbin 3 in a direction of the thickness of the plate 411. Moreover, a plurality of gear portions 411B are formed around the outer side surface of the plate 411. Note that the first C-shape groove 400 may be formed by integrally forming the closing plate 28A of the bobbin 3 and the plate 411 and by forming a C-shape groove having a bottom in the side surface of the plate 411 facing the bobbin.

A plurality of gear portions 28C are formed on the outer surface of the closing plate 28A. Since the gear portions 411B of the plate 411 and the gear portion 28C of the closing plate 28A are engaged to one another, the plate 411 is rotated together with the bobbin 3. Therefore, a groove portion having a bottom formed by the inner surface of the through hole 411A of the plate 411 and the closing plate 28A forms the first C-shape groove 400.

The through hole 411C formed to penetrate the center of the axis of the plate 411 is formed to insert the torsion bar 200A.

Figure 19:
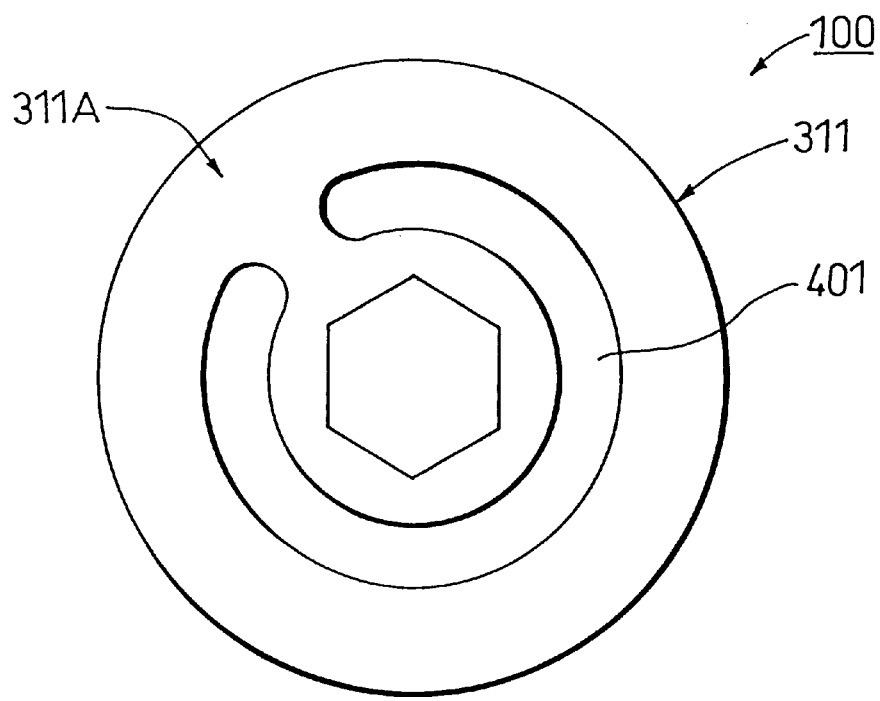
FIG. 19 is an explanatory view showing the structure of a second C-shape groove.

On the other hand, as can be understood from FIG. 19, the second C-shape groove 401 is formed in a side surface 311A of the plate 311 forming the locking means 100 opposite to the bobbin 3. The curvature radius of the second C-shape groove 401 and that of the first C-shape groove 400 are made to be different from each other. As a result, the first lock piece 407 and the second lock piece 409 are able to slide without collision to each other (as described later).

Figure 20:
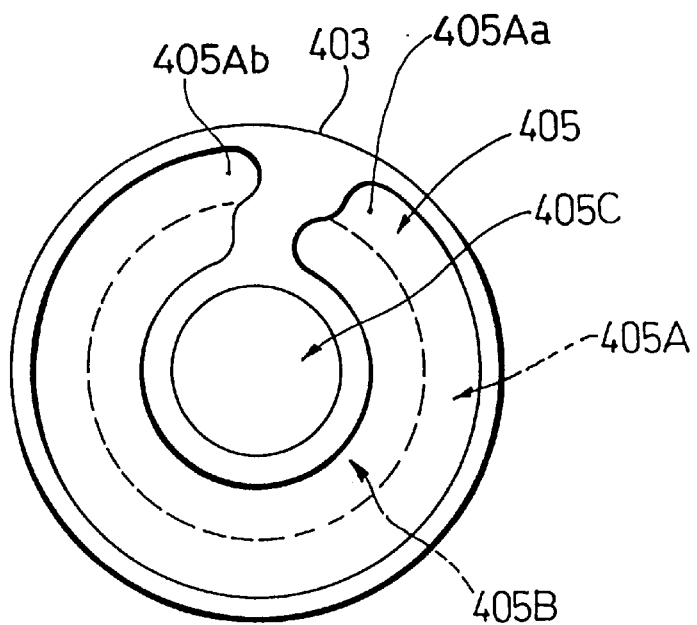
FIG. 20 is an explanatory view showing the structure of a rotational plate.

As can be understood from FIG. 20, the through hole 405 is formed in the rotational plate 403 by communicating the first through hole 405A having the shape and size of the opening of the first C-shape groove 400 (the through hole 411A) and formed in the direction of the thickness of the rotational plate 403 and the second through hole 405B having the shape and size of the second C-shape groove 401 and formed in the direction of the thickness of the rotational plate 403.

In the foregoing case, the first through hole 405A and the second through hole 405B are not required to be communicated with each other. Therefore, a structure may be employed in which a partition wall (a portion of the rotational plate 403) is interposed. Note that a through hole 405C, through which the torsion bar 200A is inserted, is formed at the central position of the axis of the rotational plate 403 in a direction of the thickness of the rotational plate 403.

The operation of the rotation restraining mechanism 300 according to this embodiment and having the above-mentioned structure will now be described with reference to FIGS. 21 to 26.

Note that imaginary axis A and imaginary axis B shown in FIGS. 21 to 26 indicate rectangular coordinates perpendicular to each other at the center C of the rotation axis of the bobbin 3. Since the imaginary axis A and imaginary axis B maintain relatively fixed positions with respect to the rotation of the bobbin 3, the bobbin 3 is, for convenience, assumed to rotate on the perpendicular coordinate plane formed by the imaginary axis A and imaginary axis B.

Figure 21:
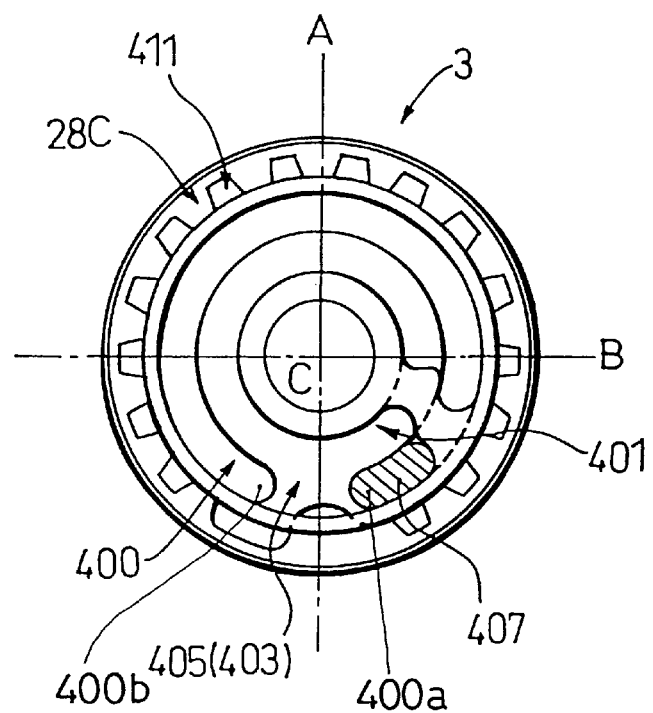
FIG. 21 is an explanatory view showing an initial state of a rotation restraining mechanism.
Figure 22:
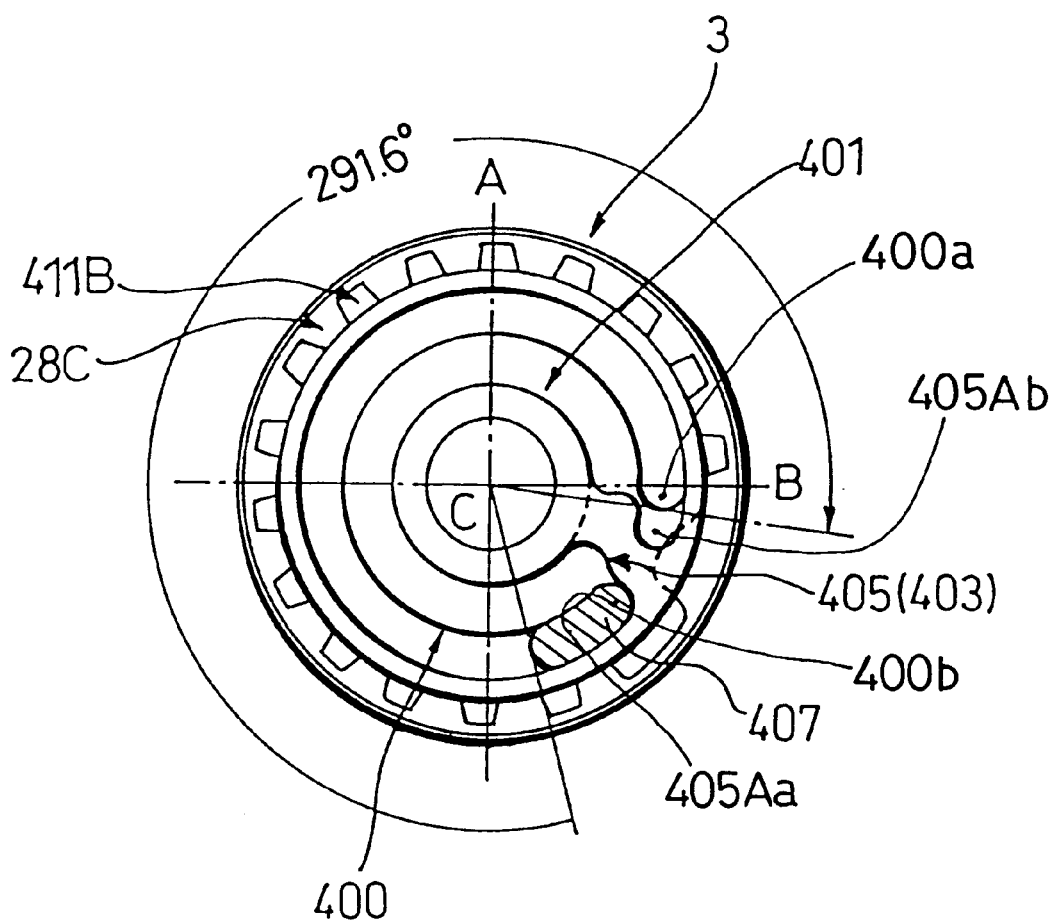
FIG. 22 is an explanatory view showing rotation of a first bobbin.

As shown in FIG. 21, if a high tension is, in an initial state, applied to the webbing 50 because of rapid stop or the like of the vehicle, the torsion bar 200A is twisted around the axis thereof similarly to the above-mentioned embodiments. Therefore, the bobbin 3 is rotated and thus the webbing 50 is drawn out.

In the foregoing state, the torsion bar 200A acts as the energy absorption mechanism. At this time, the operation of the rotation restraining mechanism 300 further rotates the bobbin 3 for a predetermined angle to permit the webbing 50 to be furthermore drawn out.

That is, in a case where the bobbin 3 is rotated clockwise when viewed in FIG. 21 in an initial state shown in FIG. 21, the bobbin 3 rotates while causing the first lock piece 407 to slide in the first C-shape groove 400. Thus, the bobbin 3 is able to rotate by an angle (for example, 291.6°) corresponding to the distance for which the first lock piece 407 slides from a lengthwise end 400a to another end 400b in the first C-shape groove 400 (a state shown in FIG. 22).

Figure 23:
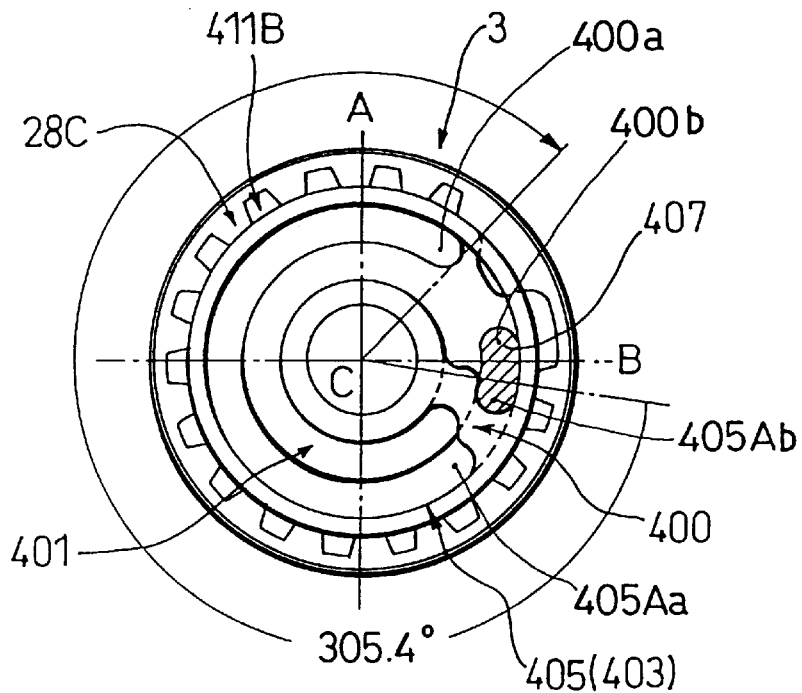
FIG. 23 is an explanatory view showing rotation of a second bobbin.

Then, in a state where the first lock piece 407 is engaged to the other lengthwise end 400b in the first C-shape groove 400, the bobbin 3 is able to rotate by an angle (for example, 305.4°) corresponding to the distance for which the first lock piece 407 slides from a lengthwise end 405Aa to another end 405Ab in the first through hole 405A (a state shown in FIG. 23).

Figure 24:
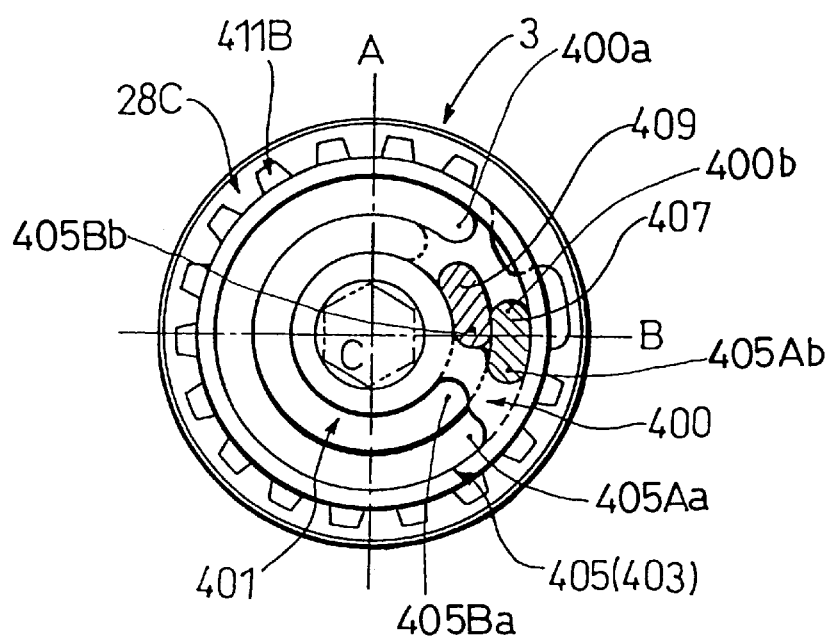
FIG. 24 is an explanatory view showing a process of the rotation of a third bobbin.
Figure 25:
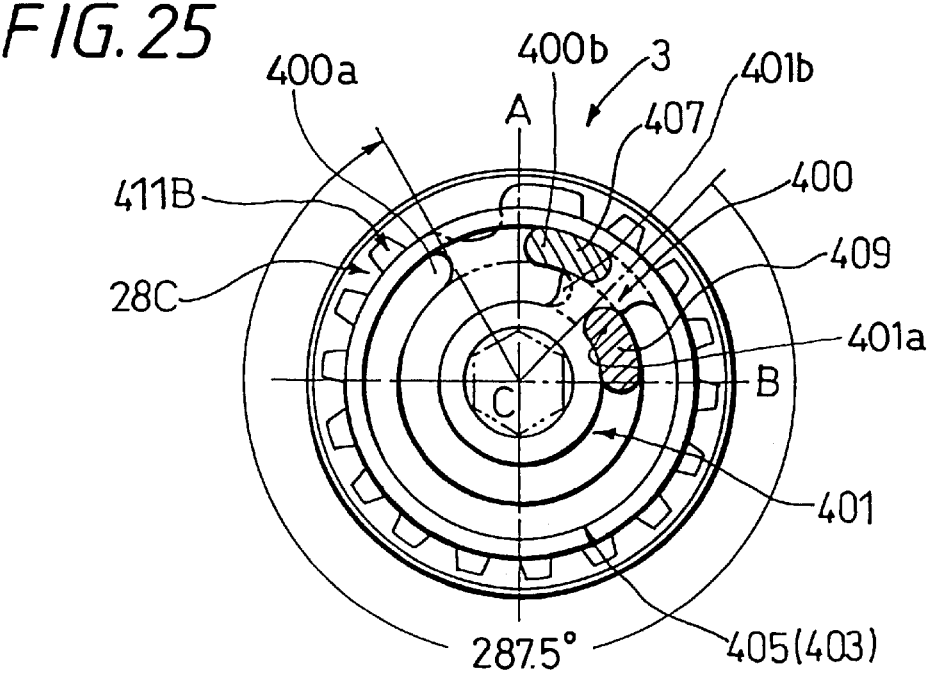
FIG. 25 is an explanatory view showing rotation of the third bobbin.
Figure 26:
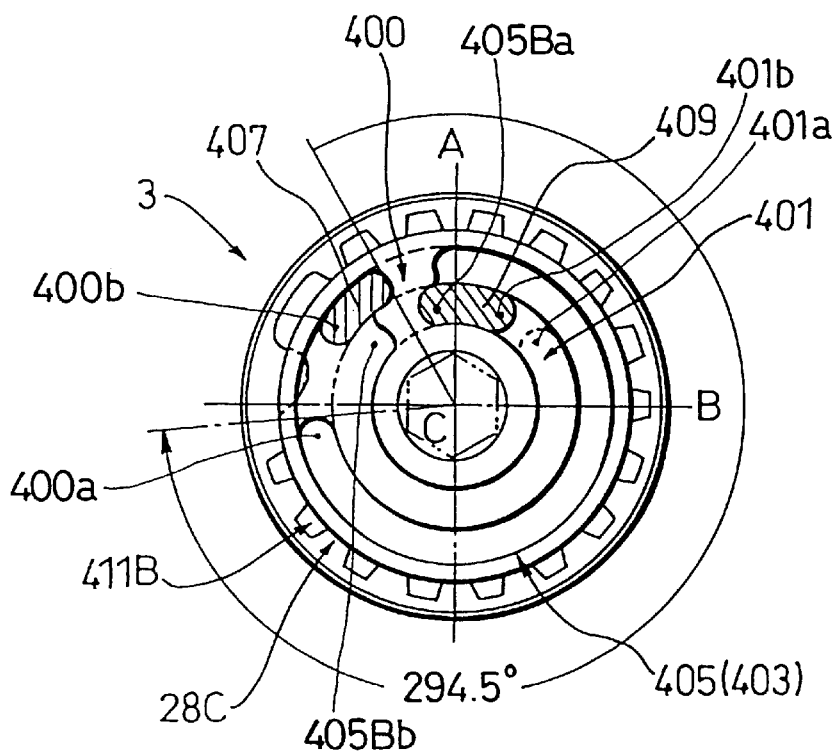
FIG. 26 is an explanatory view showing rotation of a fourth bobbin.

Then, the bobbin 3, the first lock piece 407 and the rotational plate 403 are integrally rotated. Thus, the bobbin 3 is rotated by an angle (for example, 287.5°) corresponding to the distance for which the second lock piece 409 slides from a lengthwise end 405Ba to another end 405Bb in the second through hole 405B formed in the rotational plate 403 (a state shown in FIG. 24 is realized and then a state shown in FIG. 25 is realized).

Then, the bobbin 3, the first lock piece 407, the rotational plate 403 and the second lock piece 409 are integrally rotated. Thus, the bobbin 3 is rotated by an angle (for example, 291.6°) corresponding to the distance for which the second lock piece 409 slides from a lengthwise end 401a to another end 401b in the second C-shape groove 401. Then, the overall rotation is interrupted. Therefore, the overall rotation of the bobbin 3 is permitted to be 3.275 rotations, that is, by 1179°.

Although the description has been performed about a structure in which a next rotation takes place to follow a certain rotation in order to cause the amount of rotation to easily be understood. In actual, the rotations are simultaneously and in parallel performed so that the overall amount of rotation is, for example, 3.275 times as described above.

As described above, this embodiment has the structure such that the first lock piece 407 is able to slide in the first C-shape groove 400 and the first through hole 405A. Moreover, the second lock piece is able to slide in the second C-shape groove 401 and the second through hole 405B. Therefore, even if the bobbin 3 has been temporarily inhibited by the locking means 100, the bobbin 3 is able to rotate. The rotational angle is restrained to correspond to the total length of the length of the first C-shape groove 400, that of the first through hole 405A, that of the second through hole 405B and that of the second C-shape groove 401.

Therefore, as compared with the example shown in FIG. 16, the axial directional length of the rotation restraining mechanism 300 can be shortened because the through hole 405 is formed in the rotational plate 403 as compared with the example shown in FIG. 16. As a result, the size of the retractor can be reduced.

By combining a plurality of the rotational plates 403 and the lock pieces, the restrained rotational angle of the bobbin 3 can arbitrarily be set. Thus, an appropriate restrained rotational angle can be set to be adaptable to the type and performance of the vehicle.

A fifth embodiment of the retractor for a seat belt according to the present invention will now be described.

Figure 27:
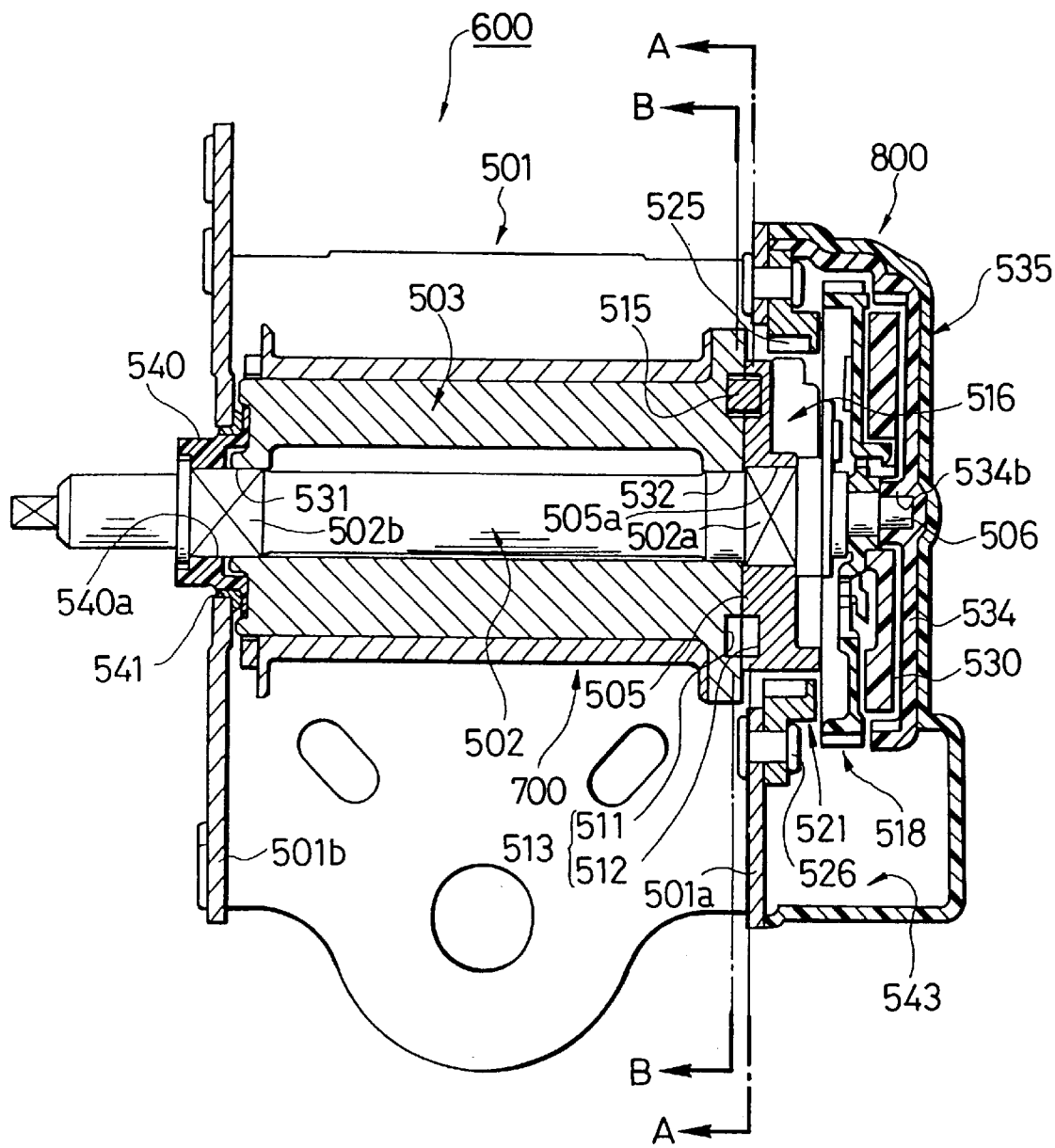
FIG. 27 is a front vertical cross sectional view showing a retractor for a seat belt according to a fifth embodiment of the present invention.
Figure 28:
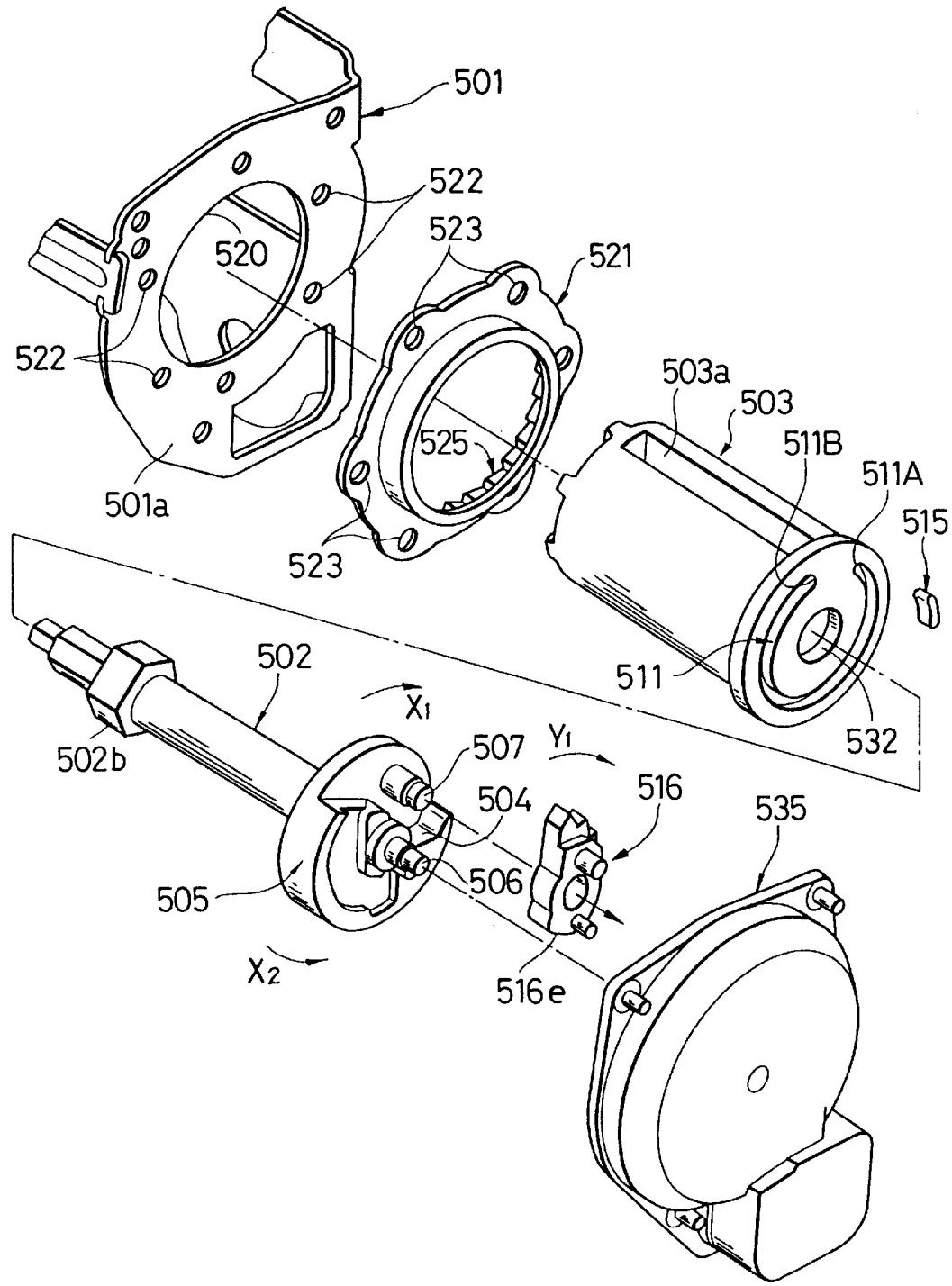
FIG. 28 is an exploded perspective view showing an essential portion of the retractor for a seat belt shown in FIG. 27.

FIG. 27 is front vertical cross sectional view showing a retractor 600 for a seat belt according to a fifth embodiment of the present invention. FIG. 28 is an exploded perspective view showing the retractor 600 for a seat belt shown in FIG. 27.

The retractor 600 for a seat belt consists of a columnar torsion bar 502 which is a shaft rotatively attached to a retractor base 501 and having a disc-like locking plate 505 serving as a locking member attached to at least either end thereof, an emergency locking means 800 serving as an emergency locking mechanism for inhibiting rotation of the locking plate 505 in the direction in which the webbing is drawn out, a cylindrical bobbin 503 around which the webbing is wound and attached to another end of the torsion bar 502 so as to be rotated integrally and lock piece 515 provided for a guide portion 513 formed at a position at which the locking plate 505 and the bobbin 503 are opposite to each other.

The retractor base 501 is mainly formed into a U-shape facing side and has opposite side plates 501a and 501b between which the torsion bar 502 combined with the bobbin 503 is rotatively arranged. The torsion bar 502 has, at another end thereof, a known wind-up spring unit (not shown) for always urging the torsion bar 502 in the direction (the direction indicated by the arrow X1 shown in FIG. 28) in which the webbing is wound up.

A substantially annular and internally-toothed ratchet 521 is formed on the outside of the shaft through hole 520 formed in the side plate 501a. Engagement internal teeth 525 are formed on the inner edge of the internally-toothed ratchet 521. The internally-toothed ratchet 521 is riveted to a hole 522 formed in the periphery of the shaft through hole 520 by a rivet 526 inserted into a hole 523 formed in the outer periphery of the internally-toothed ratchet 521.

That is, in order to inhibit rotation of the locking plate 505 in the direction in which the webbing is drawn out in an emergency of the vehicle, an engagement receiving-side portion of the emergency locking means 800 arranged to be engaged to an engagement member, to be described later, is formed by the engagement internal teeth 525.

The bobbin 503 forms an energy absorption mechanism together with the torsion bar 502 and has a cylindrical shape manufactured by combining aluminum alloy or copper and resin. A body around which the webbing is wound has a slit opening 503a through which an end of the webbing is inserted, which holds the same, and which penetrates the radial direction of the body.

The bobbin 503 has, in the two axial directional ends, a rectangular hole 531 and a round hole 532 formed into through holes. A retainer 540 inserted into a shaft through hole in the side plate 501b is attached to an end of the bobbin 503 adjacent to the wind-up spring unit (not shown) having the rectangular hole 531.

Figure 29:
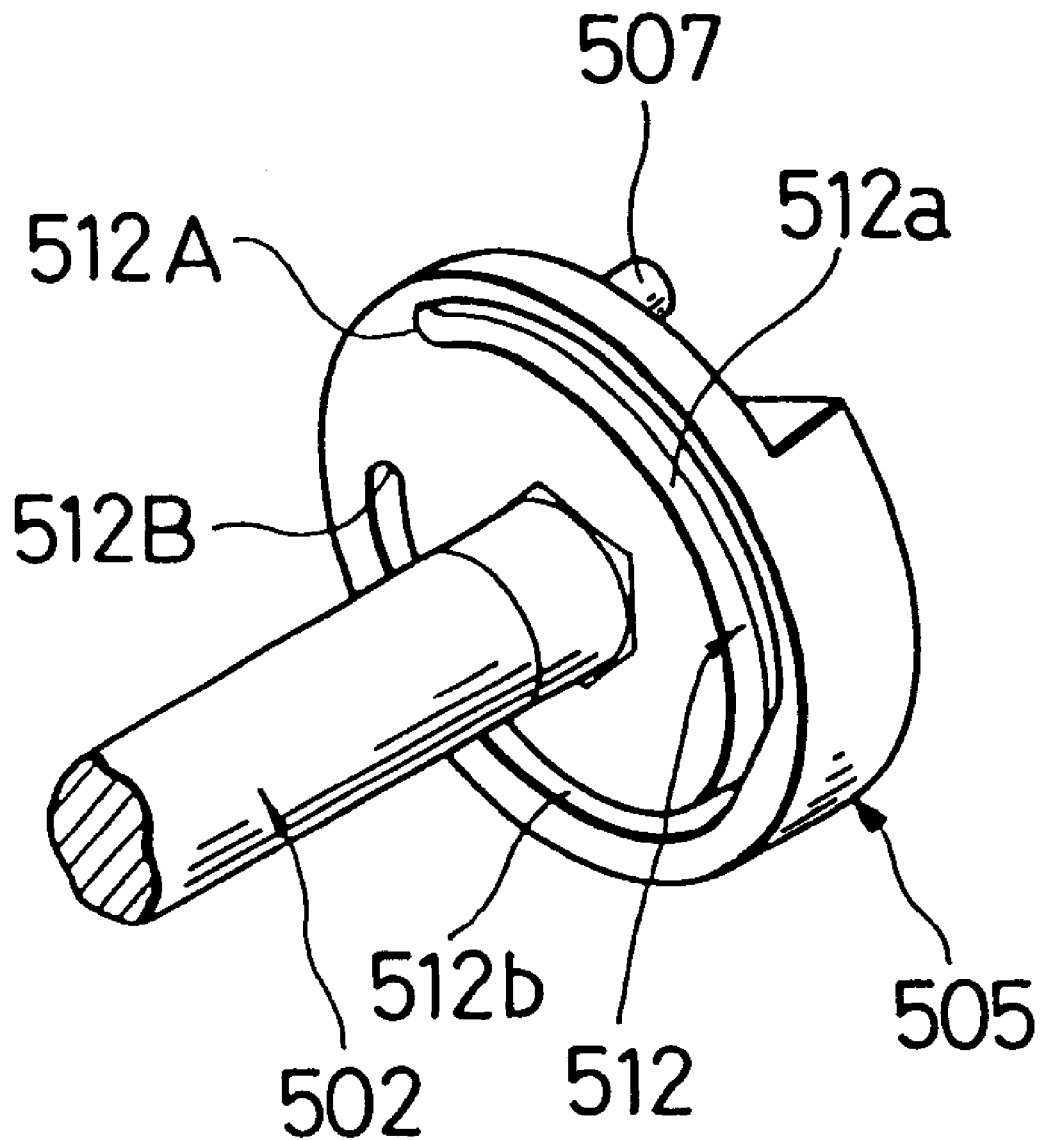
FIG. 29 is a perspective view showing an essential portion of the locking plate shown in FIG. 27.

A guide groove 511 in the form of a C-shape groove having a bottom is formed in an outer surface of an end portion of the bobbin 503 adjacent to the emergency locking means 800 having the round hole 532. Moreover, the locking plate 505 disposed opposite to the end of the bobbin 503 having the guide groove 511 formed therein has, in the inner surface thereof, a guide groove 512 for forming the guide portion 513 together with the guide groove 511, as shown in FIG. 29. Moreover, the guide portion 513 has the lock piece 515 having a curvature corresponding to the curvature of the guide grooves 511 and 512 and formed into a cocoon shape capable of sliding along the inner wall surfaces of the guide grooves 511 and 512.

Figure 30A:
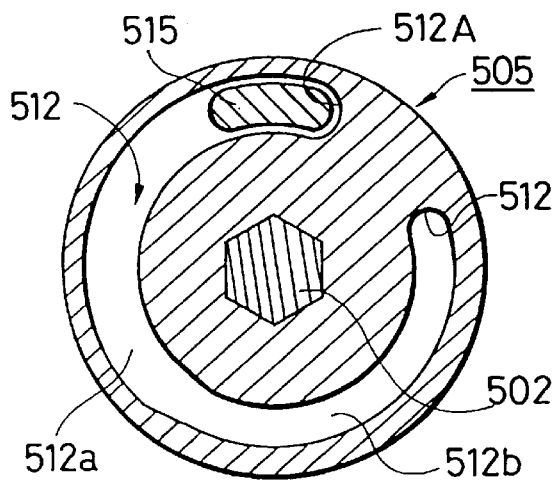
FIGS. 30(a) and 30(b) are explanatory views for explaining the operation of an energy absorption mechanism of the retractor for a seat belt shown in FIG. 27 and including FIG. 30(a) which is a cross sectional view taken along line A—A shown in FIGS. 1 and 30(b) which is a cross sectional view taken along line B—B shown in FIG. 27.
Figure 30B:
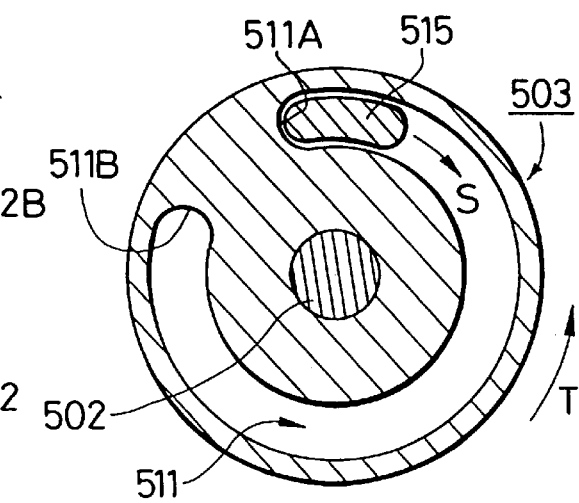

The guide groove 511 is, as shown in FIG. 30(b), structured such that the length from an initial end 512A of the guide groove 511 to the end 511B is about ¾ of the circumferential length of the bobbin 503. The groove width is fully larger than the width of the lock piece 515.

As shown in FIG. 30(a), the guide groove 512 is structured such that the length from initial end 512A of the guide groove 512 to the end 512B is about 3¾ of the circumferential length of the locking plate 505. A portion adjacent to the initial end 512A is formed into a large width portion 512a, the groove width of which is larger than the width of the lock piece 515, while a portion adjacent to the end 512B is formed into a small width portion 512b, the groove width of which is smaller than the width of the lock piece 515.

The lengths of the guide grooves 511 and 512 may arbitrarily be selected. Also the ratio of the large width portion 512a and the small width portion 512b may arbitrarily be selected.

Therefore, the lock piece 515 is able to relatively move with respect to the bobbin 503 in the overall region of the guide groove 511. In the large width portion 512a of the guide groove 512, the lock piece 515 is able to relatively move with respect to the locking plate 505. On the other hand, in the small width portion 512b of the guide groove 512, the lock piece 515 is able to relatively move with respect to the locking plate 505 while expanding or cutting the small width portion 512b to deform the small width portion 512b if force greater than a predetermined magnitude acts on the lock piece 515.

The locking plate 505 has, on the outer surface thereof, a support shaft 507 formed to project over the outer surface to support a pole 516, which is an engagement member capable of engaging to the engagement internal teeth 525, such that the pole 516 is capable of rocking and rotating. Moreover, a rotation support shaft 506 of a torsion bar 502 inserted through the locking plate 505 in order to rotatively support the bobbin 503 projects over the foregoing outer surface.

The bobbin 503 or the locking plate 505 may be structured such that the guide groove 511 or 512 is formed in a disc-like member formed individually as a through groove penetrating the disc-like member in the direction of the thickness of the same so as to integrally assemble the disc-like members with the bobbin 503 or the locking plate 505. Another structure in which either the guide groove 511 or the guide groove 512 is formed may preferably be employed.

The locking plate 505 has a pressure receiving surface 504 for locating a pole 516e (see FIG. 28) opposite to the rocking-side end of the pole 516 when the pole 516 has been rocked and rotated in a direction in which the pole 516 is engaged to the engagement internal teeth 525 and for receiving a great load applied to the pole 516 if the great load is applied.

The torsion bar 502 has, at the two axial directional ends thereof, a rectangular pole portion 502a having size permitting the rectangular pole portion 502a is able to be press-fitted into a rectangular hole 505a of the locking plate 505; and a rectangular pole portion 502b having size permitting the rectangular pole portion 502b to be press-fitted into rectangular holes 531 and 540a of a retainer 540. Thus, the rotation support shaft 506 and the rectangular pole portion 502b of the torsion bar 502 respectively are rotatively supported by a bearing portion 534b of a gear case 534, to be described later, and the retainer 540 inserted into the shaft through hole in the side plate 501b. Note that the retainer 540 is rotatively supported through an annular bearing bush 541 interposed between the retainer 540 and the side plate 501b. Although each of the rectangular pole portions 502a and 502b and the rectangular holes 505a, 531 and 540a is in the form of a hexagonal shape, the shape is not limited to this.

A ratchet wheel 518 serving as a lock operation means for operating the emergency locking means 800 in an emergency of the vehicle is disposed on the outside of the locking plate 505, the ratchet wheel 518 being relatively rotatively disposed with respect to the locking plate 505. Between the bobbin 503 and the locking plate 505, there is formed an energy absorption mechanism 700 mainly composed of the torsion bar 502. If a load (in a direction in which the bobbin 503 is rotated) larger than a predetermined value is applied to the locking plate 505 in a state where the emergency locking means 800 inhibits drawing out of the webbing, the torsion bar 502 can be twisted around the axis thereof to rotate the bobbin 503 with a predetermined torque. Therefore, even if the rotation of the locking plate 505 in the direction in which the webbing is drawn out is inhibited by the emergency locking means 800, the webbing can be drawn out under a predetermined tension applied to the webbing. Therefore, the kinetic energy of the passenger can be absorbed.

When the bobbin 503 and the locking plate 505 have relatively rotated by an angle larger than a predetermined angle and thus the torsion bar 502 has been twisted, force greater than a predetermined magnitude acts on the lock piece 515 which has been moved to the small width portion 512b of the guide groove 512. Thus, the lock piece 515 provided for the guide portion 513 expands or cut the small width portion 512b to relatively move with respect to the locking plate 505 while deforming the small width portion 512b. As a result, also the guide portion 513 and the lock piece 515 are able to absorb the collision energy acting on the body of the passenger as a deformation work.

As can be understood from FIG. 27, in a state where the torsion bar 502, the locking plate 505, the bobbin 503, the lock piece 515 and the retainer 540 have been assembled to the retractor base 501, the rectangular pole portion 502a and the rectangular pole portion 502b at the two axial directional ends of the torsion bar 502 have been press-fit into the rectangular holes 531 and 540a and the rectangular hole 505a. Therefore, the bobbin 503 is rotated integrally with the locking plate 505.

The gear case 534 disposed on the outside of the inertia plate 530 has, in the central portion thereof, a bearing portion 534b for rotatively supporting the rotation support shaft 506 of the torsion bar 502. The bottom surface of the bearing portion 534b serves to locate the torsion bar 502 in the axial direction. A box-like accommodation portion 543 for accommodating a vehicle acceleration sensitive means (not shown) is formed below the gear case 534. A sensor cover 535 is disposed on the outside of the side plate 501a which covers the gear case 534.

The operation of the retractor 600 for a seat belt will now be described.

In a normal state of use, the ratchet wheel 518 engaged to the locking plate 505 is able to rotate together with the locking plate 505. Thus, the emergency locking means 800 is in a non-operating state. Therefore, the retractor 600 is able to wind up the webbing by the urging force of a wind-up spring unit (not shown) and to draw out the webbing against the spring force.

If deceleration, such as rapid braking, having a certain magnitude of the vehicle takes place, a passenger moves forwards so that the webbing is drawn out. When excessive impulse rotational force has acted on the torsion bar 502 and the locking plate 505 through the bobbin 503 in the direction (a direction indicated by an arrow X2) in which the webbing is drawn out, the inertia plate 530 receives the inertia force so that the rotation delays with respect to the rotation of the locking plate 505 in the direction in which the webbing is drawn out. As a result, the inertia plate 530 operates a lock arm (not shown) to engage the ratchet wheel 518 to the gear case 534.

As a result, rotation of the ratchet wheel 518 delays from the locking plate 505 which is rotating in the direction in which the webbing is drawn out. Thus, the pole 516 is rocked and rotated in a direction (a direction indicated by an arrow Y1 shown in FIG. 28) in which the engagement to the engagement internal teeth 525 is established. As a result, the emergency locking means 800 is operated. The rotation of the ratchet wheel 518 is also delayed from the locking plate 505 which is rotating in the direction (a direction indicated by an arrow X2 shown in FIG. 28) in which the webbing is drawn out by the vehicle acceleration sensitive means which-has detected the acceleration of the vehicle. Thus, the pole 516 is rocked and rotated in the direction in which the engagement with the engagement internal teeth 525 is established.

When the pole 516 has been moved to a position at which the engagement with the engagement internal teeth 525 is reliably established, the rotation of the locking plate 505, which is supporting the pole 516, in the direction indicated by the arrow X2 is locked. At this time, any torsional force greater than a predetermined magnitude does not act on the torsion bar 502 having an end connected to the locking plate 505 through the rectangular hole 505a and another end connected to the bobbin 503 through the rectangular hole 531. As a result, the torsion bar 502 cannot be deformed by the torsion.

Therefore, also the rotation of the bobbin 503 in the direction indicated by the arrow X2 is locked so that the webbing is not drawn out.

If a great tension is furthermore applied to the webbing in the above-mentioned state, the bobbin 503, to which an end of the webbing is engaged, starts rotating. Thus, the torsion bar 502 having an end connected to the locking plate 505, the rotation of which has been locked, is twisted around the axis thereof. Therefore, the function of the energy absorption mechanism is performed.

Figure 31A:
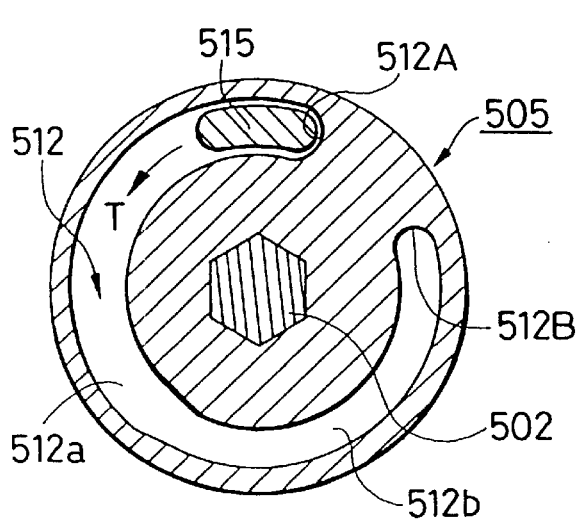
FIGS. 31(a) and (b) are explanatory views showing the operation of the energy absorption mechanism of the retractor for a seat belt shown in FIG. 27.
Figure 31B:
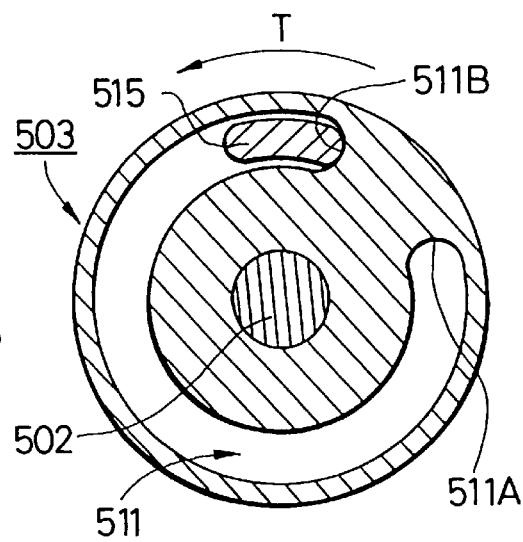

That is, in an initial state where the greater tension is applied to the webbing, the lock piece 515 is, as shown in FIG. 30, located at the initial end 511A of the guide groove 511 and the initial end 512A of the guide groove 512. Therefore, the torsion bar 502 is twisted and deformed and thus the bobbin 503 is rotated with respect to the locking plate 505 in a direction indicated by an arrow T shown in FIG. 30 by an angle corresponding to the length (¾ rotation) of the guide groove 511. Moreover, the lock piece 515 slides in the guide groove 511 to relatively move in a direction indicated by an arrow S. As a result, the lock piece 515 is moved to the end 511B of the guide groove 511, as shown in FIG. 31.

Figure 32A:
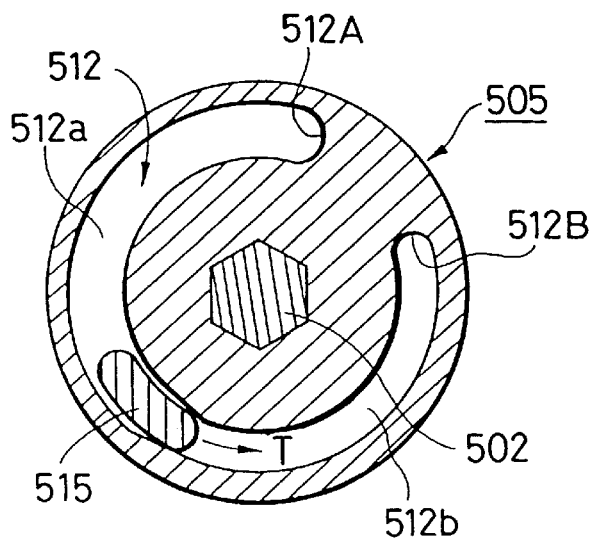
FIGS. 32(a) and (b) are explanatory views showing the operation of the energy absorption mechanism of the retractor for a seat belt shown in FIG. 27.
Figure 32B:
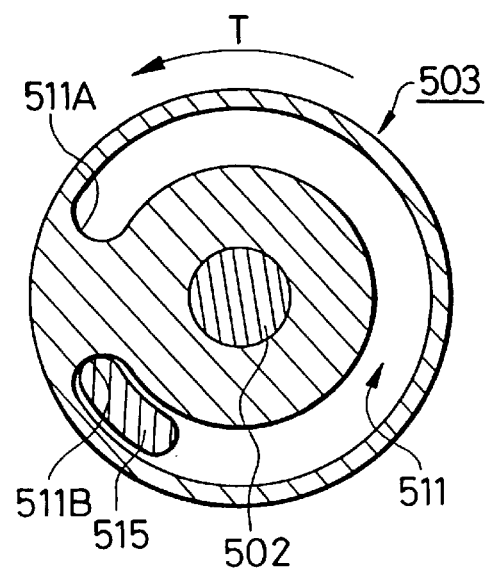

When the bobbin 503 has been rotated in the direction indicated by the arrow T shown in FIG. 30, the lock piece 515 pressed and forged to the end 511B of the guide groove 511 starts sliding at the initial end 512A of the guide groove 512 of the locking plate 505 so that it moves in the large width portion 512a of the guide groove 512 in a direction indicated by the arrow T shown in FIG. 30 to a position shown in FIG. 32(a).

Figure 34:
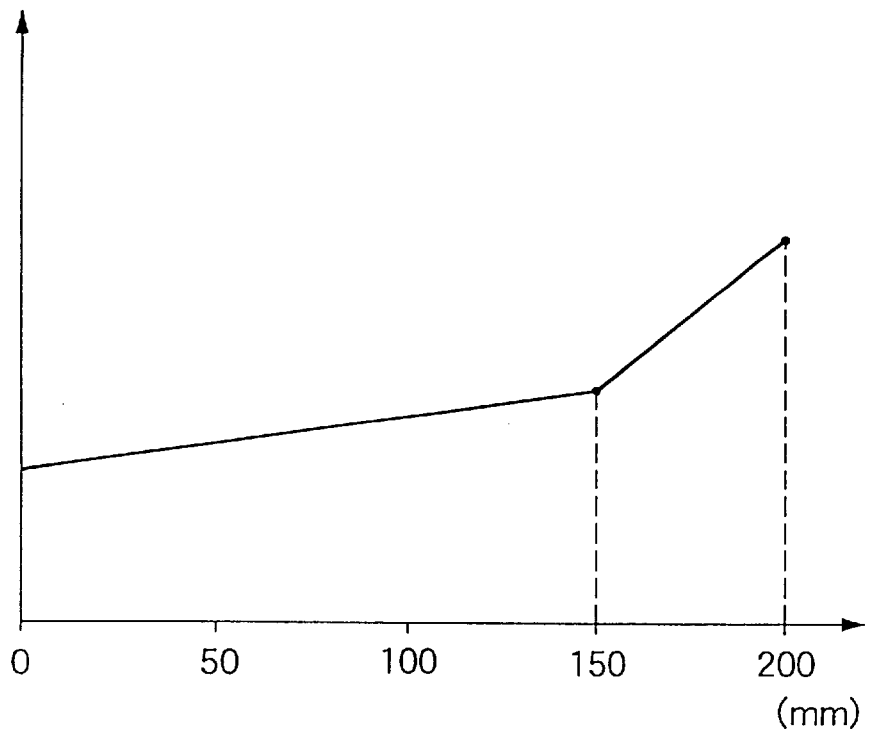
FIG. 34 is a graph showing the relationship between the amount of the webbing which is drawn out and energy absorption loads according to the fifth embodiment.

During this, the bobbin 503 is rotated with respect to the locking plate 505 by about 405° (150 mm as the amount of the webbing which has been drawn out) in the direction indicated by the arrow T. Since the lock piece 515 has been simply moved in the guide groove 511 having a large groove width in the overall region thereof and the large width portion 512a of the guide groove 512, the collision energy acting on the body of the passenger is absorbed simply as a deformation work because the torsion bar 502 is twisted around the axis thereof. That is, since the torsional deformation torque of the torsion bar 502 is substantially constant, the energy absorption torque is substantially constant over the operation range for the torsion bar 502. Therefore, a load curve of energy absorption loads (loads acting on the webbing) with respect to the amount of the webbing which has been drawn out is, as shown in FIG. 34, in a proportional state having substantially the same inclinations.

Figure 33A:
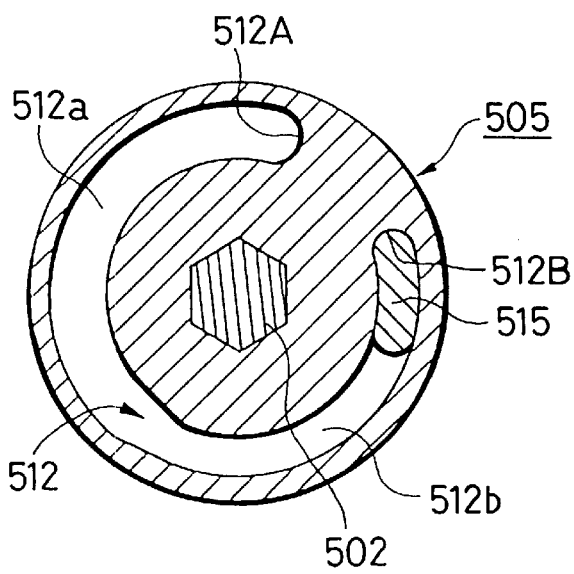
FIGS. 33(a) and (b) are explanatory views showing the operation of the energy absorption mechanism of the retractor for a seat belt shown in FIG. 27.
Figure 33B:
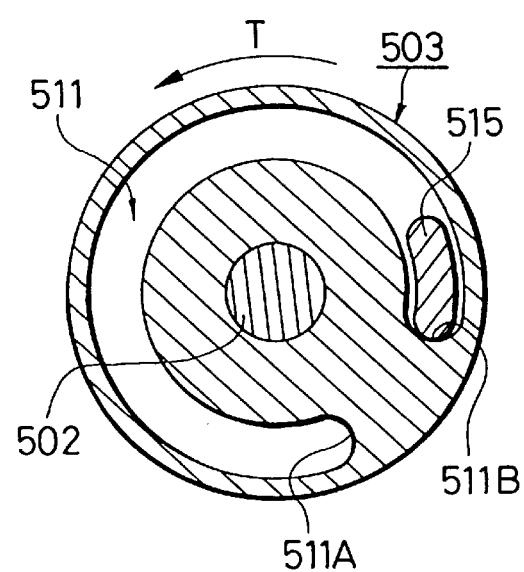

When the bobbin 503 is furthermore rotated in the direction indicated by the arrow T shown in the figure above and thus the torsion bar 502 has been twisted, an excessively large force acts on the lock piece 515 which has been moved to the small width portion 512b of the guide groove 512. Thus, the lock piece 515 moves in the small width portion 512b of the guide groove 512 in the direction indicated by the arrow T shown in the figure above to the end 512B shown in FIG. 33(a) while expanding or cutting the small width portion 512b to deform the small width portion 512b.

In a period in which the bobbin 503 is rotated with respect to the locking plate 505 by about 405° to about 540° (150 to 200 mm as the amount of the webbing which has been drawn out) in the direction indicated by the arrow T, also the deformation of the small width portion 512b caused by the lock piece 515 is able to absorb the collision energy acting on the body of the passenger as a deformation work. Therefore, the load curve of the energy absorption loads is changed to have inclinations obtained by synthesizing the amount of the torsion of the torsion bar 502 and the amount (including the frictional force) of the deformation of the small width portion 512b, as shown in FIG. 34.

When the lock piece 515 has been moved to the end 512B of the guide groove 512, the relative rotation of the bobbin 503 with respect to the locking plate 505 is restrained by the lock piece 515. Therefore, furthermore torsion of the torsion bar 502 is inhibited.

As described above, the retractor 600 for a seat belt has the structure such that if an excessive tension is applied to the webbing after the pole 516 has been engaged to the engagement internal teeth 525 in an emergency of the vehicle and thus the rotation of the locking plate 505 has been temporarily inhibited by the emergency locking means 800, then the torsion bar 502 is twisted to correspond to the rotation of the bobbin 503. Thus, the webbing can be drawn out. Thus, the energy absorption mechanism is operated. If the bobbin 503 and the locking plate 505 are furthermore rotated by angles larger than a predetermined angle (which is about 405° in the fifth embodiment), the bobbin 503 is rotated in a state where the lock piece 515 deforms the small width portion 512b. Therefore, the energy absorption loads are made to be loads obtained by synthesizing the amount of the torsion of the torsion bar 502 and the amount of the deformation of the small width portion 512b.

Therefore, arbitrary selections of the distance of the guide grooves 511 and 512, the ratio of the large width portion 512a and the small width portion 512b and the groove width of the small width portion 512b enable the load curve of the energy absorption loads with respect to the amount of the webbing which is drawn out to easily be changed. As a result, an arbitrary load characteristic adaptable to the characteristic of the vehicle can be obtained. Thus, a satisfactory energy absorption mechanism capable of efficiently absorbing collision energy acting on the body of a passenger when the vehicle encounters a collision can be formed.

The structure of the guide portion according to the present invention is not limited to the structures of the guide groove 511 and the guide groove 512 according to the fifth embodiment. A various modifications may, of course, be employed. For example, a large width portion and a small width portion may be provided for the guide groove 511 and the groove width of the guide groove 512 is made to be larger than the width of the lock piece 515 in the overall region.

If the groove width of the guide grooves is made to be smaller at the initial position, looseness of the lock piece can be prevented and thus noise generated attributable to the looseness can be prevented. If a tapered portion is formed in the insertion portion of the lock piece in this case, assembling can easily be performed.

If the dimensions and shape are determined to enable the lock piece to be press-fitted to the initial position of the guide groove, load correction of a type for rapidly raising the energy absorption load when the energy absorption mechanism is operated can be performed. In this case, the restraining performance of the seat belt apparatus can be improved.

FIGS. 35 to 38 are cross sectional views showing essential portions of a bobbin and a locking plate according to a sixth embodiment of the present invention.

Figure 35A:
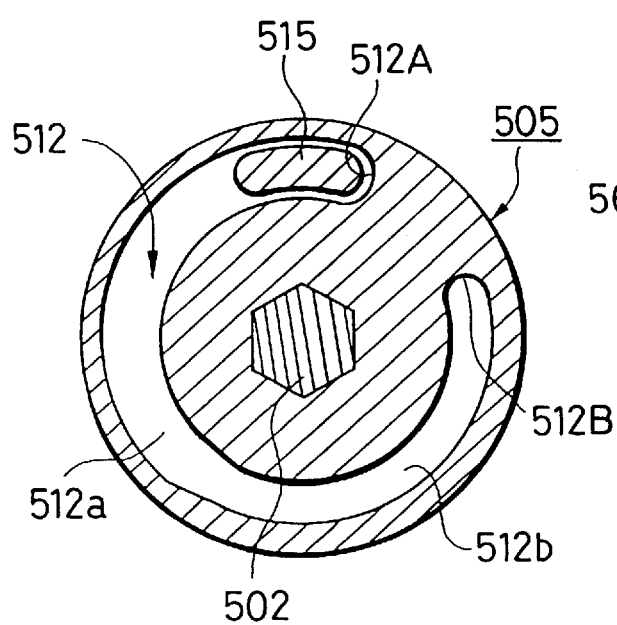
Figure 35B:
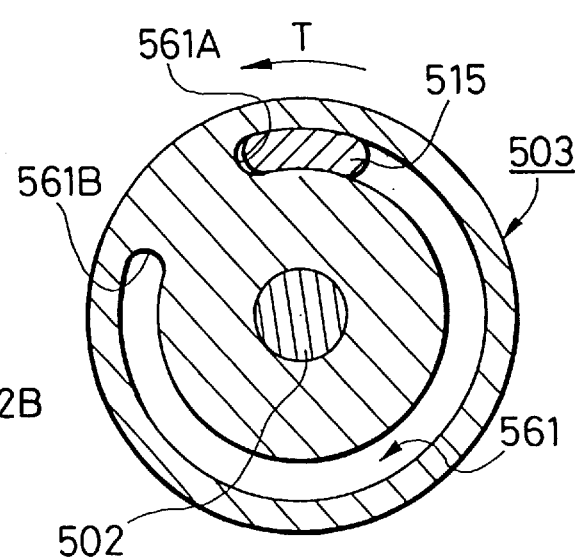
Figure 36A:
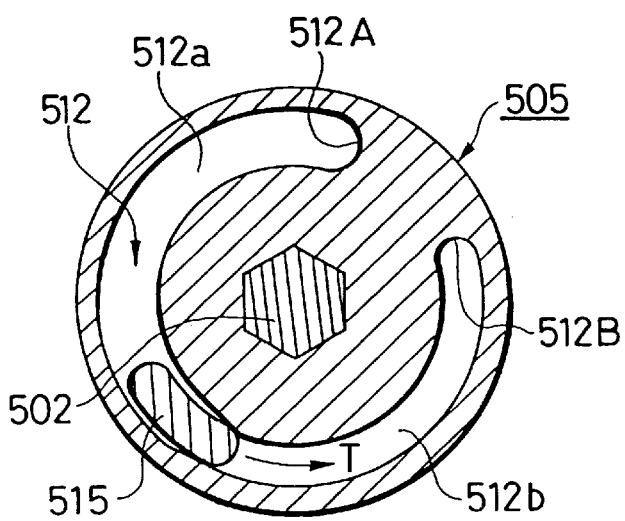
FIGS. 36(a) and (b) are explanatory views showing the operation of the energy absorption mechanism for the bobbin and the locking plate shown in FIG. 9.
Figure 36B:
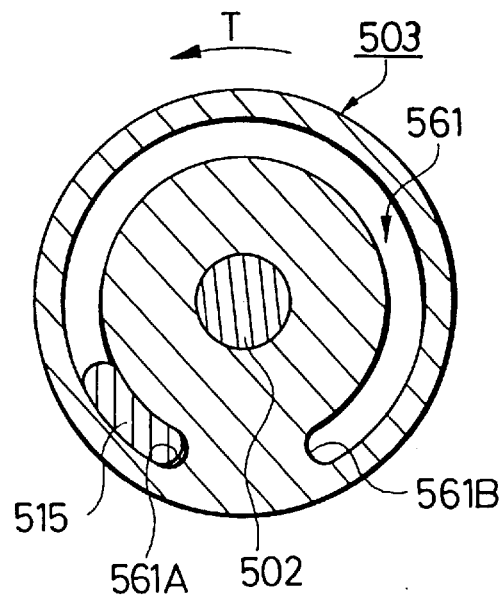
Figure 37A:
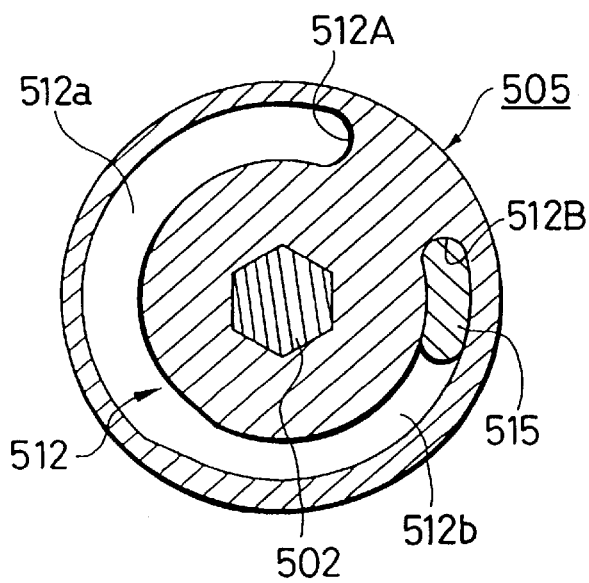
FIGS. 37(a) and (b) are explanatory views showing the operation of the energy absorption mechanism for the bobbin and the locking plate shown in FIG. 9.
Figure 37B:
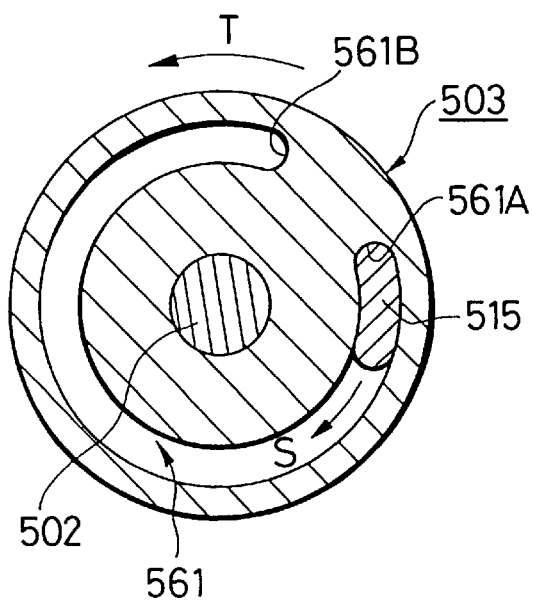

Referring to FIG. 35, a guide groove 561 of the bobbin 503 is designed such that a length from an initial end 561A of the guide groove 561 to an end 561B is about ¾ of the circumferential length of the bobbin 503 and formed into a narrow deformation portion having a width smaller than the width of the lock piece 515 in the overall region thereof. However, only the groove width at the initial position may be larger than the width of the lock piece 515 in order to mount the lock piece 515. Since the guide groove of the locking plate 505 is the same as the guide groove 512 according to the fifth embodiment, the same reference numeral is given similar to other similar elements and they are omitted from description.

When a tension greater than a predetermined level is applied to the webbing in an emergency of a vehicle, the retractor for a seat belt according to the sixth embodiment is, similar to the retractor 600 for a seat belt according to the fifth embodiment, operated such that the torsion bar 502 is twisted to correspond to the rotation of the bobbin 503 so that the webbing is drawn out. Thus, the function of the energy absorption mechanism is operated.

That is, as shown in FIG. 35, in a state where a greater tension is commenced to be applied to the webbing, the lock piece 515 is positioned at the initial end 561A of the guide groove 561 and the initial end 512A of the guide groove 512. When the bobbin 503 has been rotated with respect to the locking plate 505 by about 135° (which is 50 mm as the amount of the webbing which has been drawn out) in the direction indicated by an arrow T, also the lock piece 515, together with the bobbin 503, slides and moves in the large width portion 512a of the guide groove 512. Thus, the lock piece 515 is moved to the small width portion 512b of the guide groove 512.

During this, the bobbin 503 is rotated with respect to the locking plate 505 by about 135° in the direction indicated by the arrow T. Since the lock piece 515 has been simply moved in the large width portion 512a of the guide groove 512, the collision energy acting on the body of the passenger is absorbed simply as a deformation work because the torsion bar 502 is twisted around the axis thereof. That is, since the torsional deformation torque of the torsion bar 502 is substantially constant, the energy absorption torque is substantially constant over the operation range for the torsion bar 502. Therefore, a load curve of energy absorption loads (loads acting on the webbing) with respect to the amount of the webbing which has been drawn out is, as shown in FIG. 39, in a proportional state having substantially the same inclinations.

When the bobbin 503 is furthermore rotated in the direction indicated by the arrow T shown in the figure above, force greater than a predetermined magnitude acts on the lock piece 515 which has been moved to the small width portion 512b of the guide groove 512. Thus, the lock piece 515 moves to the end 512B shown in FIG. 37(a) in a direction indicated by the arrow T shown in the figure above while expanding or cutting the small width portion 512b to deform the small width portion 512b. When the bobbin 503 is furthermore rotated in the direction indicated by the arrow T in the figure above, the lock piece 515 moves in a direction indicated by an arrow S shown in FIG. 37(b) while expanding or cutting the guide groove 561 to deform the same. Thus, the lock piece 515 is moved to the end 561B of the guide groove 561, as shown in FIG. 38(b).

That is, in a period in which the bobbin 503 is rotated with respect to the locking plate 505 by about 135° to about 540° (which are 50 to 200 mm as the amount of the webbing which has been drawn out) in the direction indicated by the arrow T, also the deformations of the small width portion 512b and the guide groove 561 performed by the lock piece 515 are able to absorb the collision energy acting on the body of the passenger as a deformation work. Therefore, the load curve of energy absorption loads with respect to the amount of the webbing which has been drawn out is changed to have inclinations obtained by synthesizing the amount of the torsion of the torsion bar 502 and the deformations (including the frictional force) of the small width portion 512b and the guide groove 561, as shown in FIG. 39.

When the lock piece 515 has been moved to the end 561B of the guide groove 561, the relative rotation of the bobbin 503 with respect to the locking plate 505 is restrained by the lock piece 515. Therefore, the torsion of the torsion bar 502 is inhibited.

Although the sixth embodiment has been described to have the structure in which the lock piece 515 initially deforms the small width portion 512b and then it deforms the guide groove 561, the lock piece 515 may initially deform the guide groove 561 before it deforms the small width portion 512b.

Figure 40:
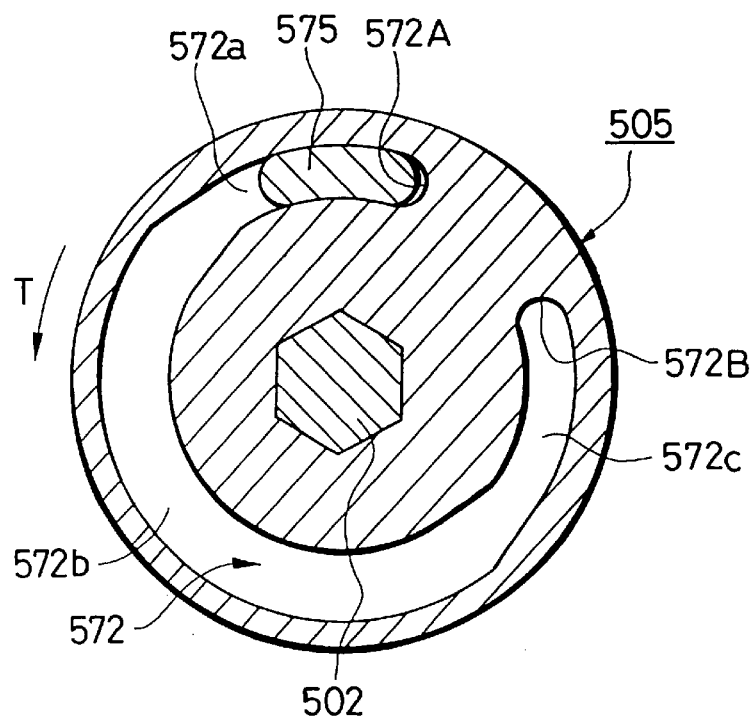
FIG. 40 is a cross sectional view showing an essential portion of a locking plate according to a seventh embodiment of the present invention.

FIG. 40 is a cross sectional view showing an essential portion of a locking plate according to a seventh embodiment of the present invention.

Referring to FIG. 40, a guide groove 572 of the locking plate 505 is formed such that the length from an initial end 572A of the guide groove 572 to the end 572B is about ¾ of the circumferential length of the locking plate 505. The shape at the initial end 572A is formed into a small width portion 572a which is a deformed portion having a groove width which is smaller than the width of the lock piece 575, that at the intermediate position is formed into a large width portion 572b having a groove width larger than the width of the lock piece 575 and that at the end 572B is again formed into a small width portion 572c which is a deformed portion having a groove width which is smaller than the width of the lock piece 575. On the other hand, the guide groove is omitted in the end portion of the bobbin 503 and only the lock piece 575, which is formed integrally, is formed to project over the end of the bobbin 503. The above-mentioned structures are different from the foregoing embodiments. The other structures are the same as the foregoing embodiments.

When a tension higher than a predetermined level is applied to the webbing in an emergency of the vehicle, the retractor for a seat belt according to the seventh embodiment, similarly to the retractor for a seat belt according to each of the above-mentioned embodiments, is operated as follows: the torsion bar 502 is twisted to correspond to the rotation of the bobbin 503 so that the webbing is drawn out. Thus, the function as the energy absorption mechanism is operated.

That is, when the torsion bar 502 has been twisted and deformed and thus the bobbin 503 (not shown) has been rotated with respect to the locking plate 505 in the direction indicated by an arrow T shown in the figure above, the lock piece 575 formed integrally with the bobbin 503 is sequentially moved in the small width portion 572a, the large width portion 572b and the small width portion 572c of the guide groove 572. Thus, the lock piece 575 moves to the end 572B while deforming the small width portion 572a and the small width portion 572c. When lock piece 575 has been moved to the end 572B, the relative rotation of the bobbin 503 with respect to the locking plate 505 is restrained. Thus, the further torsion of the torsion bar 502 is inhibited.

Figure 41:
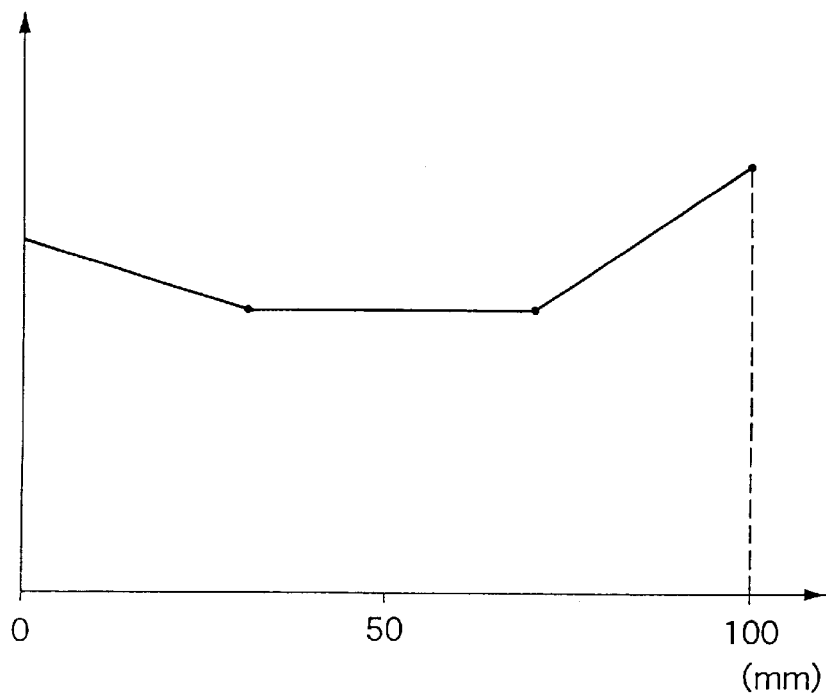
FIG. 41 is a graph showing the relationship between the amounts of the webbing which is drawn out and energy absorption loads according to a seventh embodiment.

Therefore, the load curve of energy absorption loads (loads acting on the webbing) during the foregoing period is able to have a load characteristic obtained by synthesizing the amount of the torsion of the torsion bar 502 and the amount (including the frictional force) of the deformation of the guide groove 572 and as shown in FIG. 41.

Figure 42:
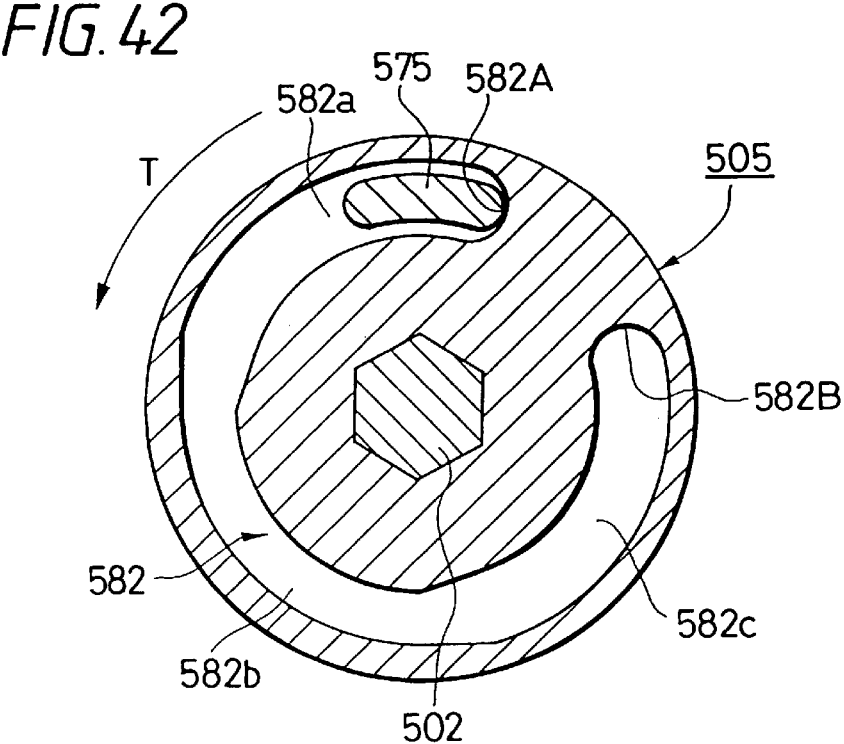
FIG. 42 is a cross sectional view showing an essential portion of a locking plate according to an eighth embodiment of the present invention.

FIG. 42 is a cross sectional view showing an essential portion of a locking plate according to an eighth embodiment of the present invention.

Referring to FIG. 42, a guide groove 582 of the locking plate 505 is designed such that the length from the initial end 582A to an end 582B of the guide groove 582 is about ¾ of the outer circumferential length of the locking plate 505. A portion of the guide groove 582 at the initial end 582A is formed into a large width portion 582a having a groove width larger than the width of the lock piece 575, a portion at an intermediate position is formed into a small width portion 582b having a groove width smaller than the width of the lock piece 575, and a portion at the end 582B is again formed into a small width portion 582c having a groove width larger than the width of the lock piece 575. The other structures are similar to those according to the seventh embodiment.

Figure 43:
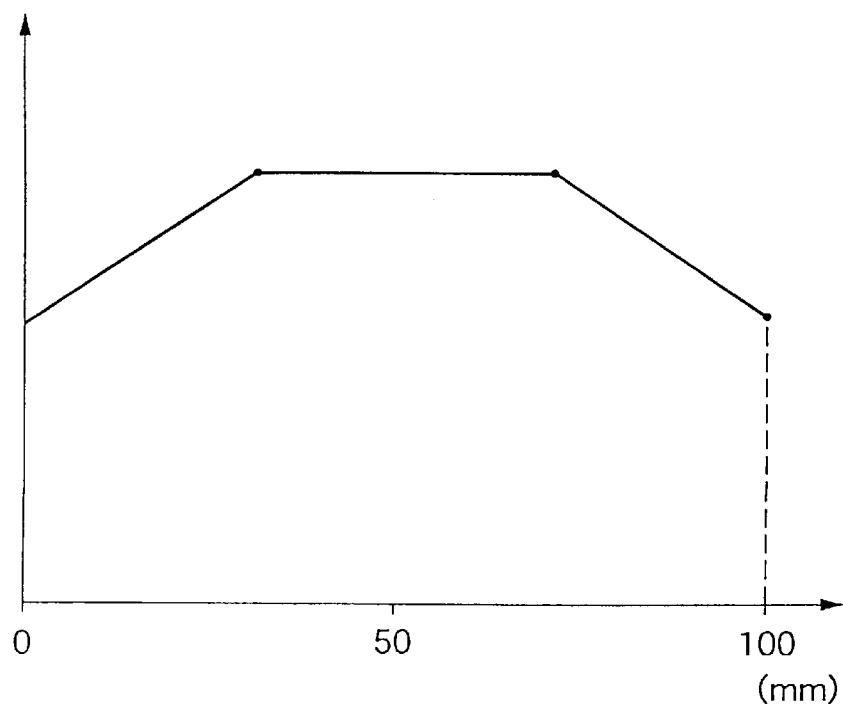
FIG. 43 is a graph showing the relationship between the amounts of the webbing which are drawn out and energy absorption loads according to the eighth embodiment.

A load curve of energy absorption loads (loads acting on the webbing) in an emergency of the vehicle is able to have a load characteristic obtained by synthesizing the amount of the torsion of the torsion bar 502 and the amount (including frictional force) of the deformation of the guide groove 582, as shown in FIG. 43.

Although the seventh to eighth embodiments have been described to have the structure in which the lock piece 575 is formed to project over the end of the bobbin 503, the lock piece 575 may be formed to project over the locking plate 505 and the guide groove 572 or 582 may be formed in the end portion of the bobbin 503.

Figure 44:
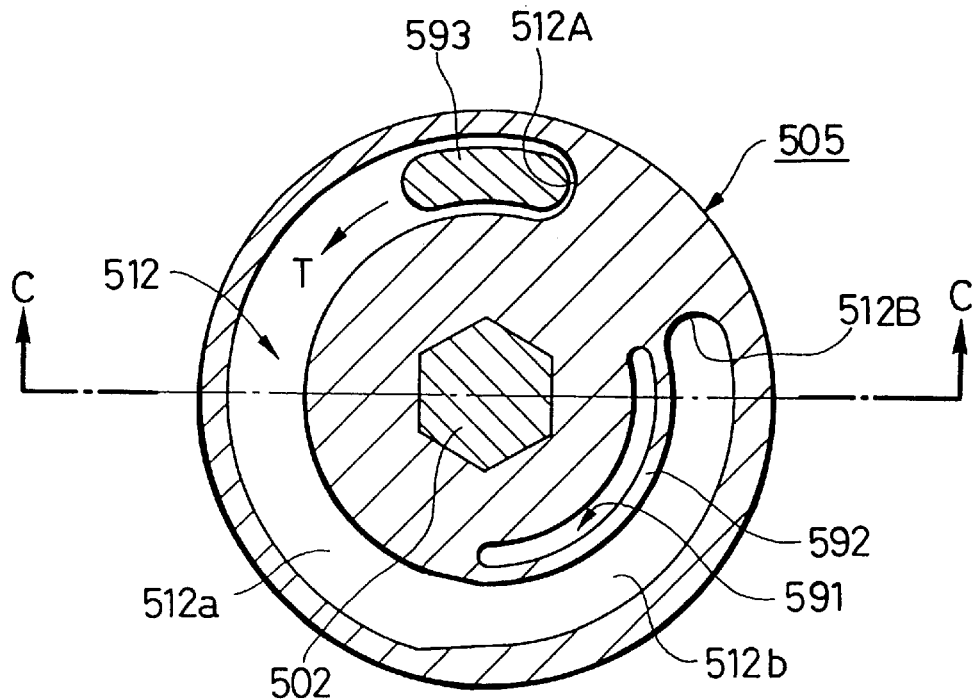
FIG. 44 is a cross sectional view showing an essential portion of a locking plate according to a ninth embodiment of the present invention.
Figure 45:
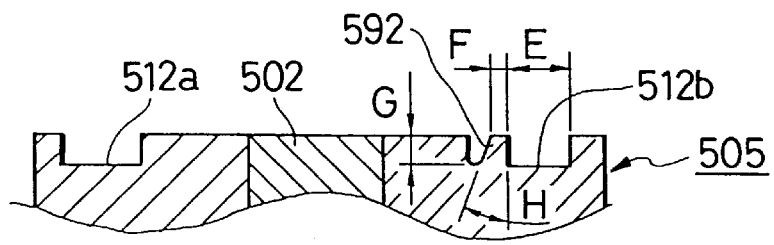
FIG. 45 is a cross sectional view taken along line C—C shown in FIG. 18.

FIG. 44 is a cross sectional view showing a locking plate according to a ninth embodiment of the present invention, and FIG. 45 is a cross sectional view taken along line C—C shown in FIG. 45.

Referring to FIG. 18, a thinned groove 591, which is a thinned portion, is formed on the inside of the small width portion 512b of the guide groove 512 of the locking plate 505 to run parallel to the small width portion 512b.

The thinned groove 591 is formed by thinning an inner side wall 592 of the small width portion 512b to easily deform the inner side wall 592 in order to easily expand the small width portion 512b when the lock piece 593 (which may be formed integrally with the bobbin 503 or individually formed from the same) passes through the small width portion 512b.

By causing the small width portion 512b to easily be deformed, the energy absorption load can easily be adjusted. That is, the energy absorption load can be adjusted by changing the width E of the small width portion 512b, the thickness F of the inner side wall 592, the depth G of the thinned groove 591 and the angle H of the side wall. As compared with the structure in which the thinned groove 591 is not provided, the amount of the deformation of the inner side wall 592 can be enlarged. Therefore, the load can easily be adjusted and therefore the accuracy of the width E of the small width portion 512b can be roughened.

The thinned portion according to the ninth embodiment is not required to the groove as the thinned groove 591. The portion is required to have a structure with which the side wall of the small width portion 512b can easily be deformed. For example, the thinned portion may be formed into a circular recess or a thinned groove may be formed on the outside of the small width portion. Moreover, the width E of the small width portion 512b, the thickness F of the inner side wall 592, the depth G of the thinned groove 591 and the angle H of the side wall may arbitrarily be omitted or modified to be adaptable to the characteristic of the vehicle.

Although the small width portion of each of the guide grooves according to the foregoing embodiments is formed such that the groove width is reduced from the two side walls of the small width portion, the groove width may, of course, be reduced from either the inner side wall or the outer side wall.

Figure 46:
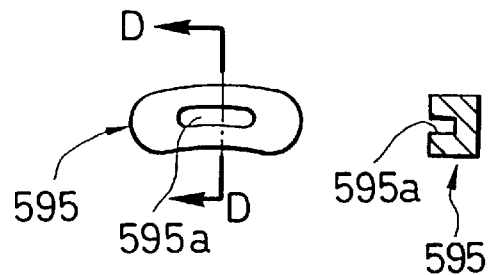
FIG. 46 is a front view showing a lock piece according to a tenth embodiment of the present invention and is a cross sectional view taken along line D—D of the front view above.

FIG. 46 is a front view and a cross sectional view taken along line D—D shown in the front view showing a lock piece 595 according to a tenth embodiment of the present invention.

The lock piece 595 has a recess 595a in the central portion thereof so as to be compressive-deformed in the widthwise direction thereof. The lock piece 595 expands the small width portion 512b and is compressive-deformed when it passes through the small width portion 512b.

Therefore, the energy absorption load can be stabilized and setting of values can easily be performed. As a result, the dimension accuracies of the lock piece 595 and the small width portion 512b can be roughened.

Figure 47:
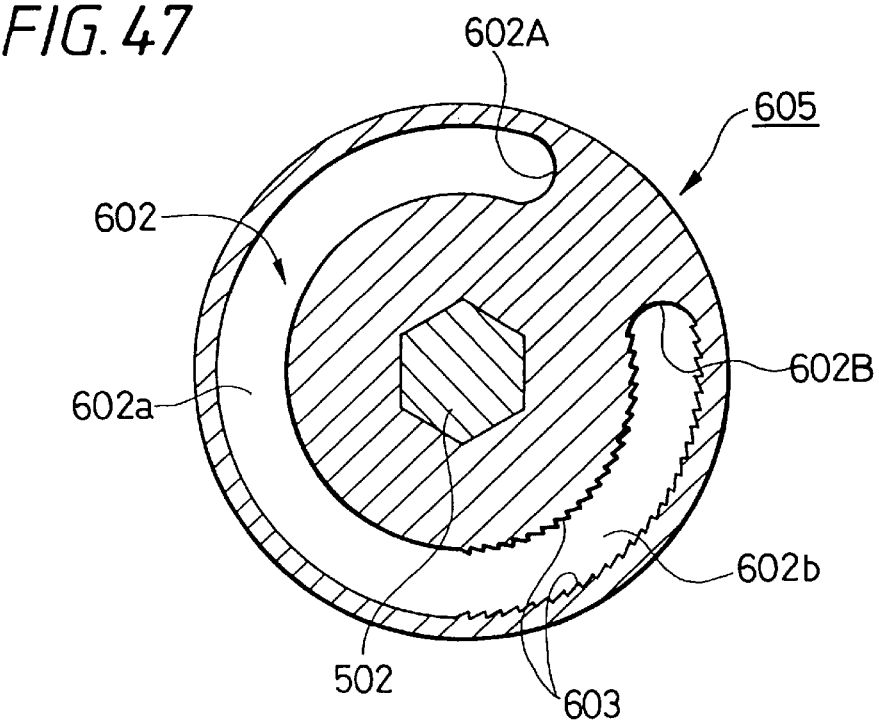
FIG. 47 is a cross sectional view showing an essential portion of a locking plate according to an eleventh embodiment of the present invention.

FIG. 47 is a cross sectional view showing an essential portion of a locking plate according to an eleventh embodiment of the present invention.

Referring to FIG. 47, a guide groove 602 of a locking plate 605 is structured such that a length from an initial end 602A of the guide groove 602 to an end 602B is about ¾ of the circumferential length of the locking plate 605. The guide groove 602 is, at the initial end 602A, formed into a large width portion 602a having a groove width larger than the width of a lock piece (not shown) and, at the end 602B, formed into a small width portion 602b structured such that the length between leading ends of projections 603 in the sawtooth shape projecting over the two side walls is slightly smaller than the width of the lock piece.

The groove width (the distance between the leading ends of the projections 603 projecting over the two side walls) of the small width portion 602b and the size, pitch, the apex angle and the number of the projections 603 may arbitrarily be changed to be adaptable to the characteristic of the vehicle.

Since the lock piece moves while deforming the projections 603 when the lock piece passes through the small width portion 602b, the accuracies of the small width portion 602b and the lock piece can be roughened. If fitting is performed tightly, the lock piece is not caught at an intermediate position and thus the movement stroke can be secured. By forming the shape of each of the projections 603 into an asymmetric shape as shown in FIG. 47, reversion of the lock piece can be prevented.

The projections 603 may be formed to project over only either side wall of the small width portion 602b. The guide groove 602 having the small width portion 602b in the form of the foregoing projections 603 may be provided for at least either of two opposite surfaces of the bobbin and the locking plate.

Figure 48:
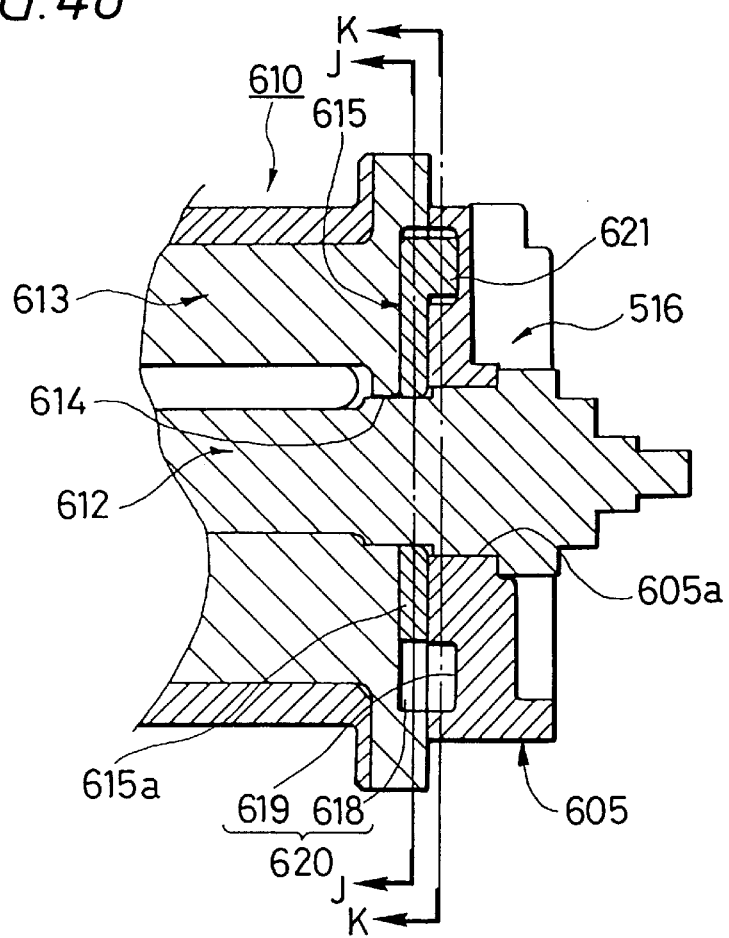
FIG. 48 is a cross sectional view showing an essential portion of a retractor for a seat belt according to a twelfth embodiment of the present invention.
Figure 49:
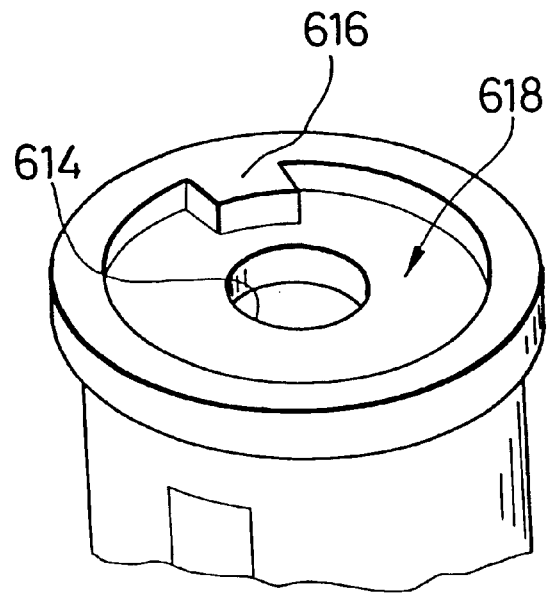
FIG. 49 is a partial perspective view showing the bobbin shown in FIG. 48.
Figure 50:
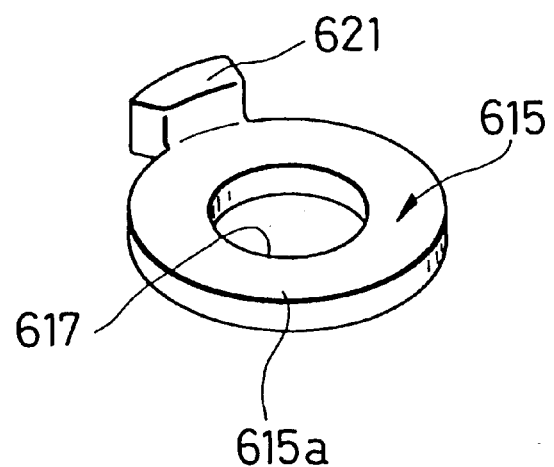
FIG. 50 is an overall perspective view showing the lock piece shown in FIG. 48.

FIG. 48 is a cross sectional view showing an essential portion of a retractor 610 for a seat belt according to a twelfth embodiment of the present invention. FIGS. 49 and 50 are a partial perspective view of a bobbin 613 shown in FIG. 48 and an overall perspective view of a lock piece 615. Similar elements to those of the retractor 600 for a seat belt according to the fifth embodiment are given the same reference numerals and they are omitted from the detailed description.

The retractor 610 for a seat belt has a columnar torsion bar 612 which is a wind-up shaft rotatively attached to the retractor base 501 and having at least an end to which the locking plate 605 is attached; an emergency locking means 800 for inhibiting the rotation of the torsion bar 612 in the direction in which the webbing is drawn out in an emergency of the vehicle; a cylindrical bobbin 613 around which the webbing is wound and supported rotatively with respect to the torsion bar 612, and a lock piece 615 disposed in a guide portion 620 formed in a portion in which the locking plate 605 and the bobbin 613 face each other.

A substantially circular shape recess 618 is formed in an end of the bobbin 613 having a round hole 114 and adjacent to the emergency locking means 800. A guide groove 619 forming a guide portion 620 together with the recess 618 is formed in the inner surface of the locking plate 605 opposite to the end of the bobbin 613 having the recess 618, as shown in FIG. 51. The guide portion 620 has the lock piece 615 having a round hole 617 rotatively supported by the torsion bar 612 and capable of moving along the bottom surface of the recess 618.

The lock piece 615 has an engagement portion 621 in the form of a trapezoid-like shape outwards projecting in the radial direction over the outer surface of a ring-shape portion 615a thereof. The engagement portion 621 has a thickness which is substantially twice that of the ring-shape portion 615a.

Figure 51A:
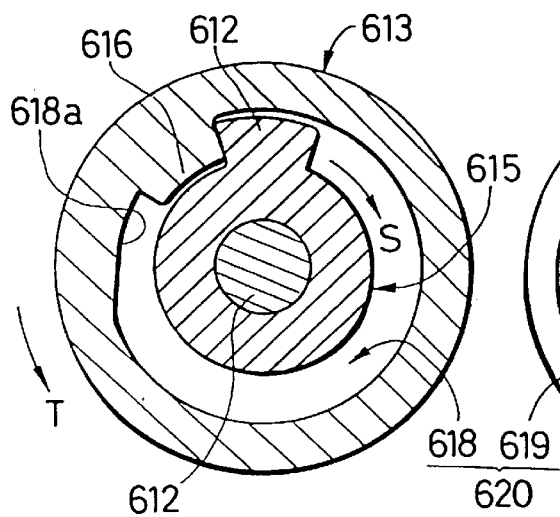

The recess 618, as shown in FIG. 49, has an engagement portion 616 having the inner wall, a portion of which is formed into a trapezoid-like shape inwards projecting in the radial direction. As shown in FIG. 51(a), a portion (an end region) of the inner wall of the recess 618 adjacent to the engagement portion 616 is formed eccentrically in the radial direction so that a small-diameter portion 618a which is forcibly in contact with the outer end of the engagement portion 621 is formed. On the other hand, the inner wall except the small-diameter portion 618a has a diameter which is sufficiently large with respect to the outer end of the engagement portion 621.

Figure 51B:
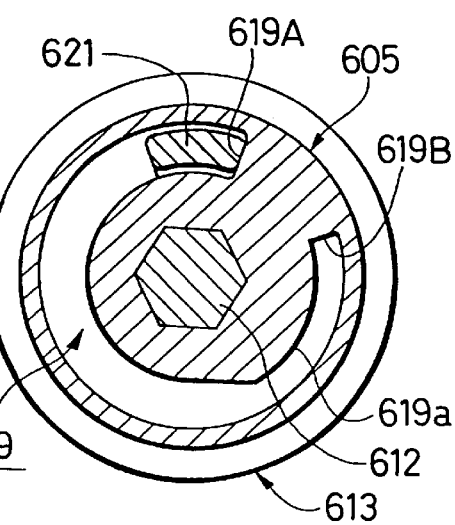

The guide groove 619, as shown in FIG. 51(b), is structured such that the length from an initial end 619A of the guide groove 619 to an end 619B is about ¾ of the circumferential length of the locking plate 605. The guide groove 619 has a groove width sufficiently larger than the width of the engagement portion 621 of the lock piece 615 at the initial end 619A. At the end 619B, a portion of the inner wall of the guide groove 619 is eccentrically outwardly formed in the radial direction so that a large-diameter portion 619a arranged to be forcibly in contact with the inner end of the engagement portion 621 is formed.

Figure 52:
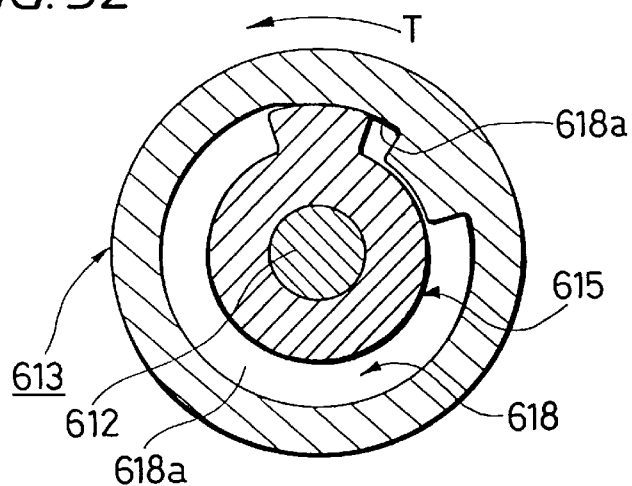
FIG. 52 is a cross sectional view for explaining the operation of the energy absorption mechanism for the retractor for a seat belt shown in FIG. 48.

That is, as shown in FIG. 51, in a state where the emergency locking means 800 has been operated and a greater tension is commenced to be applied to the webbing, the engagement portion 621 of the lock piece 615 is positioned in the initial region of the recess 618 and at the initial end 619A of the guide groove 619. When the bobbin 613 has been rotated with respect to the locking plate 605 by an angle corresponding to the length (¾ rotation) of the guide groove 619 in the direction indicated by the arrow T shown in FIG. 51, the lock piece 615 slides on the bottom surface of the recess 618 and relatively rotate in the direction indicated by the arrow S. Also the engagement portion 621 slides in the guide groove 619 so as to relatively move in the direction indicated by the arrow S. Thus, the engagement portion 621 is moved to the end region of the recess 618, as shown in FIG. 52. At this time, the engagement portion 621 is, by the small-diameter portion 618a, inwards compressed in the radial direction. Moreover, the small-diameter portion 618a is outwards expanded in the radial direction by the engagement portion 621. Thus, the energy absorption load can be enlarged.

Figure 53:
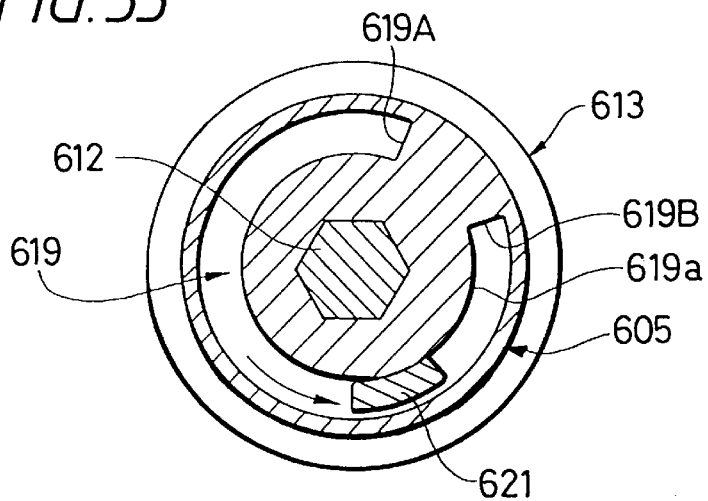
FIG. 53 is a cross sectional view showing the locking plate for explaining the operation of the energy absorption mechanism for the retractor for a seat belt shown in FIG. 48.

When the bobbin 613 has been furthermore rotated in the direction indicated by the arrow T shown in FIG. 51, the engagement portion 621 of the lock piece 615 pressed and urged to the engagement portion 616 of the bobbin 613 starts sliding at the initial end 619A of the guide groove 619. Thus, the engagement portion 621 moves in the guide groove 512 to a position shown in FIG. 53 in the direction indicated by the arrow T shown in the figure above.

When the bobbin 613 has been furthermore rotated in the direction indicated by the arrow T shown in the figure above, the engagement portion 621 of the lock piece 615, which has been moved to the large-diameter portion 619a of the guide groove 619, is outwardly expanded in the radial direction by the large-diameter portion 619a. Moreover, the large-diameter portion 619a is inwardly compressed by the engagement portion 621 in the radial direction. Thus, frictional force is generated with the inner wall of the guide groove 619 so that the energy absorption load is enlarged.

The lock piece 615 according to the twelfth embodiment is rotatively supported by the torsion bar 612 so that rotation is permitted. Therefore, when energy is being absorbed by only the torsion of the torsion bar 612, the lock piece 615 is not brought into contact with the inner wall of the recess 618 and the two side walls of the guide groove 619 so that smooth rotation is assured.

Therefore, the plane accuracies of the inner wall of the recess 618, the two side walls of the guide groove 619 and the outer surface of the lock piece 615 can be roughened. Moreover, the groove width of the guide groove 619 can be made to be sufficiently larger than the width of the engagement portion 621 to roughen the dimension accuracy. As a result, the manufacturing cost can be reduced.

Although the twelfth embodiment has the structure such that the large-diameter portion 619a serving as a deformation portion is provided for the guide groove 619, the deformation portion may be, for example, a small width groove.

The retractor for a seat belt according to the present invention is not required to be combined with the torsion bar as has been required for the retractor for a seat belt according to each of the foregoing embodiments. The energy absorption load may be borne by only the guide portion. The foregoing structure may be applied to a retractor for a seat belt of a type in which a pair of engagement members are disposed at the two ends of a bobbin made to be relatively rotatable with respect to a wind-up shaft; and in which non-engagement portions are provided for the two side plates of a retractor base.

The emergency locking means is not limited to the above-mentioned structures according to the respective embodiments. A variety of modifications are permitted. For example, the inertial sensitive means arranged to be operated in an emergency of a vehicle may have a structure having either the vehicle acceleration sensitive means or the webbing acceleration sensitive means.

Also the structure of the guide portion formed in the portion in which the locking plate and the bobbin face each other is not limited to the structures according to the foregoing embodiments. For example, the structure of the guide grooves according to the embodiments above may arbitrarily be combined to obtain energy absorption mechanisms having various energy absorption characteristics.

As can be understood from the description above, the retractor for a seat belt according to the present invention has the structure such that if a predetermined load is applied to the locking means, then the engagement member is engaged to an engagement receiving-side portion so that rotation of the wind-up shaft is temporarily inhibited by the locking means. If a load larger than that of the locking means is applied, the wind-up shaft is rotated to correspond to the rotation of the shaft so that the webbing is permitted to be drawn out. Since the state where the webbing can be drawn out is made to be a predetermined angle because the rotation of the wind-up shaft is restrained by the rotation restraining mechanism, the amount of the webbing which is drawn out is restrained to an appropriate amount even if the shaft is excessively twisted in an emergency of the vehicle. Thus, the safety of the vehicle can be improved.

The retractor for a seat belt according to the present invention enables the energy absorption load to arbitrarily be changed to be adaptable to the characteristic of the vehicle only by changing the shape of the guide portion formed in the portion in which the locking plate and the bobbin face each other.

Consequently, a retractor for a seat belt having a satisfactory energy absorption mechanism adaptable to the characteristic of the vehicle and capable of efficiently absorbing collision energy acting on the body of a passenger when the vehicle collides, can be provided.

What is claimed is:

1. A retractor for a seat belt comprising:
    a retractor base formed into a substantially U-shape and having opposite side plates, each of said opposite side plates including a through hole;
    a shaft rotatively attached to said retractor base, said shaft having a first non-circular portion at one end thereof and a second non-circular portion at an other end thereof;
    a bobbin secured to said first non-circular portion of said shaft and around which a webbing is wound;
    a locking member secured to said second non-circular portion of said shaft;
    an emergency locking mechanism for inhibiting rotation of said locking member in a direction in which said webbing is drawn out in an emergency of a vehicle, said emergency locking mechanism including a pawl which supported by said locking member and being kept in a non-engagement position where said pawl is disengaged from an inner peripheral surface of said through hole and said pawl allowing said shaft to rotate relative to said retractor base; and
    a rotation restriction mechanism disposed between said bobbin and said locking member to restrict an amount of torsion of said shaft to a predetermined amount when rotation of said locking member has been inhibited by said pawl;
    wherein said rotation restriction mechanism includes:
        an engaging protrusion which formed on one of said bobbin and said locking member; and
        an engaged portion which is formed on the other of said bobbin and said locking member and is brought into engagement with said engaging protrusion in a radial direction so as to restrict a further rotation of said bobbin relative to said locking member when said bobbin has been rotated by the predetermined amount.

2. The retractor for a seat belt according to claim 1, wherein said engaging protrusion is movably formed on said one of said bobbin and said locking member.

* * * * *